US011748713B1

(12) United States Patent
Tran et al.

(10) Patent No.: US 11,748,713 B1
(45) Date of Patent: Sep. 5, 2023

(54) DATA INGESTION AND UNDERSTANDING FOR NATURAL LANGUAGE PROCESSING SYSTEMS

(71) Applicant: Amazon Technologies, Inc., Seattle, WA (US)

(72) Inventors: Luu Tran, Sunnyvale, CA (US); Omer Luzzatti, Portola Valley, CA (US); Nathanael Joe Hayashi, Piedmont, CA (US); Abhinav Athreya, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/836,027

(22) Filed: Mar. 31, 2020

(51) Int. Cl.
*G10L 15/18* (2013.01)
*G06N 5/02* (2023.01)
*G10L 15/08* (2006.01)
*G10L 13/02* (2013.01)
*G06Q 10/1093* (2023.01)

(52) U.S. Cl.
CPC ............ *G06Q 10/1093* (2013.01); *G06N 5/02* (2013.01); *G10L 13/02* (2013.01); *G10L 15/08* (2013.01); *G10L 2015/088* (2013.01)

(58) Field of Classification Search
CPC .... G10L 15/22; G10L 2015/223; G10L 17/00; G10L 17/06; G10L 15/063; G10L 13/00; G10L 13/02; G10L 15/18; G10L 2015/088; G06F 16/3329; G06F 16/3344; G06F 3/167
See application file for complete search history.

(56) References Cited

U.S. PATENT DOCUMENTS

| | | | |
|---|---|---|---|
| 10,957,329 B1* | 3/2021 | Liu et al. ............ | G06F 16/9038 |
| 2011/0166904 A1* | 7/2011 | Arrowood et al. ......................... | |
| | | | G06Q 10/06313 |
| | | | 705/7.23 |
| 2014/0343990 A1* | 11/2014 | Photowat .............. | G06Q 50/01 |
| | | | 705/7.17 |
| 2015/0248651 A1* | 9/2015 | Akutagawa et al. | G06F 16/2465 |
| | | | 705/7.19 |
| 2018/0144743 A1* | 5/2018 | Aggarwal et al. ..... | G06F 40/56 |
| 2019/0005458 A1* | 1/2019 | Mallipudi et al. . | G06Q 10/1093 |
| 2019/0075067 A1* | 3/2019 | Sachidanandam et al. ................ | |
| | | | G06Q 10/107 |
| 2019/0103101 A1* | 4/2019 | Danila et al. .......... | G06F 40/35 |
| 2019/0197491 A1* | 6/2019 | Silva et al. ........ | G06F 16/90335 |
| 2020/0065342 A1* | 2/2020 | Panuganty .......... | G06F 16/9535 |
| 2020/0175292 A1* | 6/2020 | Casado et al. ..... | G06K 9/00926 |
| 2020/0184156 A1* | 6/2020 | Badr et al. ............. | G06F 9/541 |

\* cited by examiner

*Primary Examiner* — Jakieda R Jackson
(74) *Attorney, Agent, or Firm* — PIERCE ATWOOD LLP

(57) ABSTRACT

Techniques for improving a natural language processing (NLP) system by ingesting information from various sources and generating personalized results in response to a user query. With user permission, the system may ingest personal data from a variety of data sources, allowing the system to access existing personal data in order to identify correlated information, make inferences and predictions, prompt the user when appropriate, and generate improved results. The ingestion step may process both textual and non-textual data (e.g., images, audio, video). Using this consolidated data storage, the system may search amongst multiple different sources of data and identify correlations to improve processing. In addition, the system may proactively provide suggestions to a customer (e.g., detect upcoming event and suggest an action corresponding to the event) or may provide personalized results (e.g., filter results based on user preferences determined by the inferences and predictions).

18 Claims, 19 Drawing Sheets

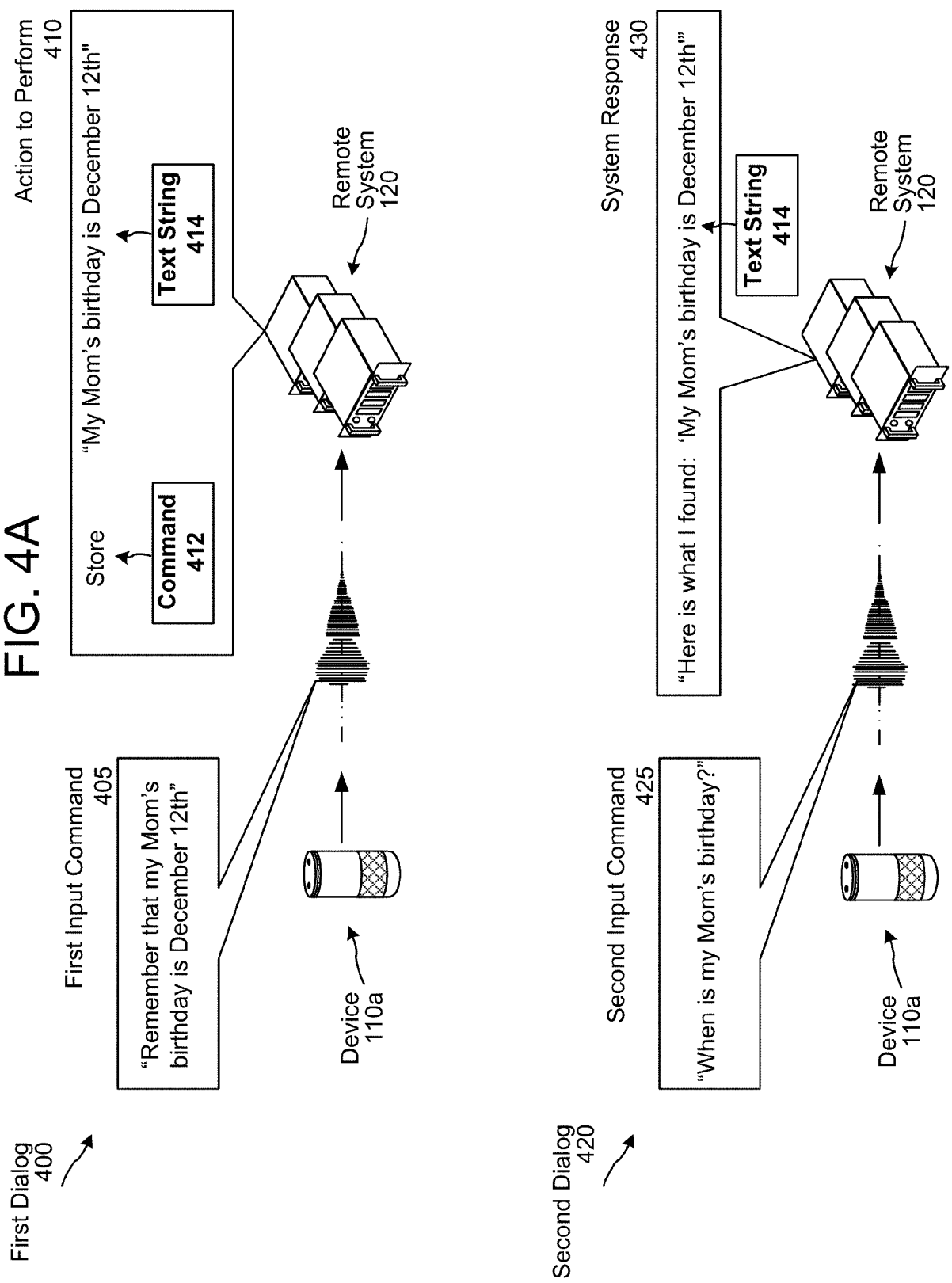

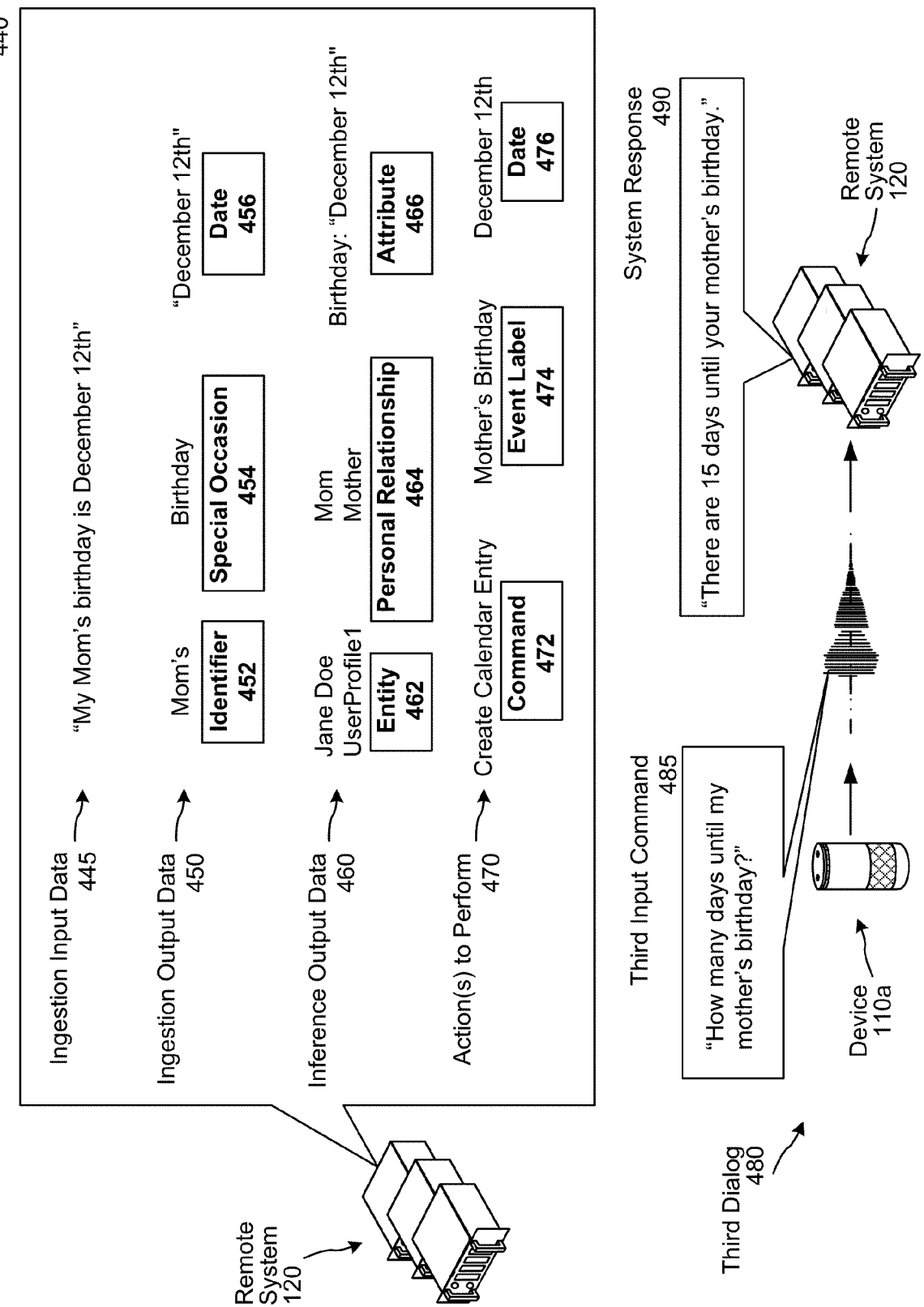

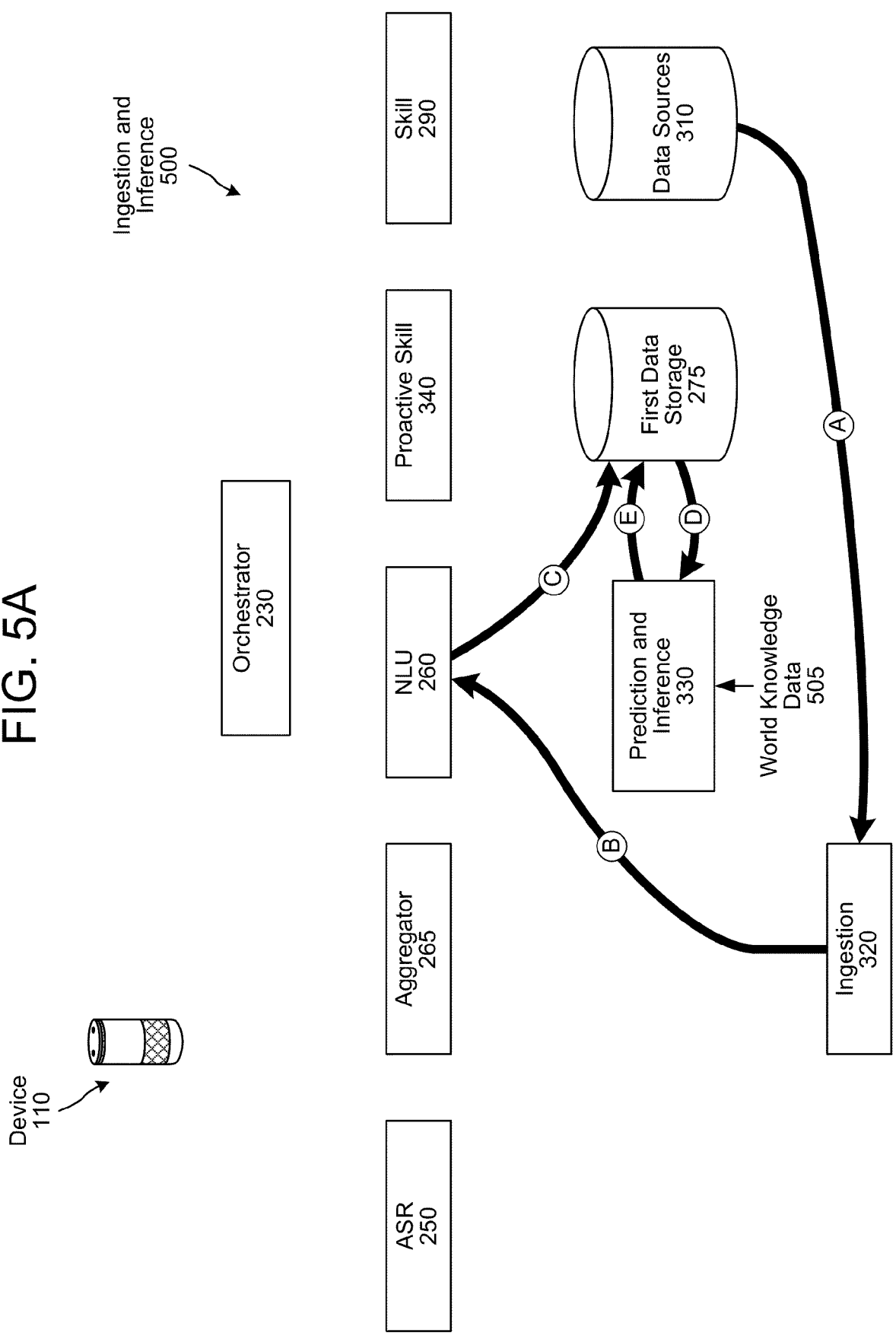

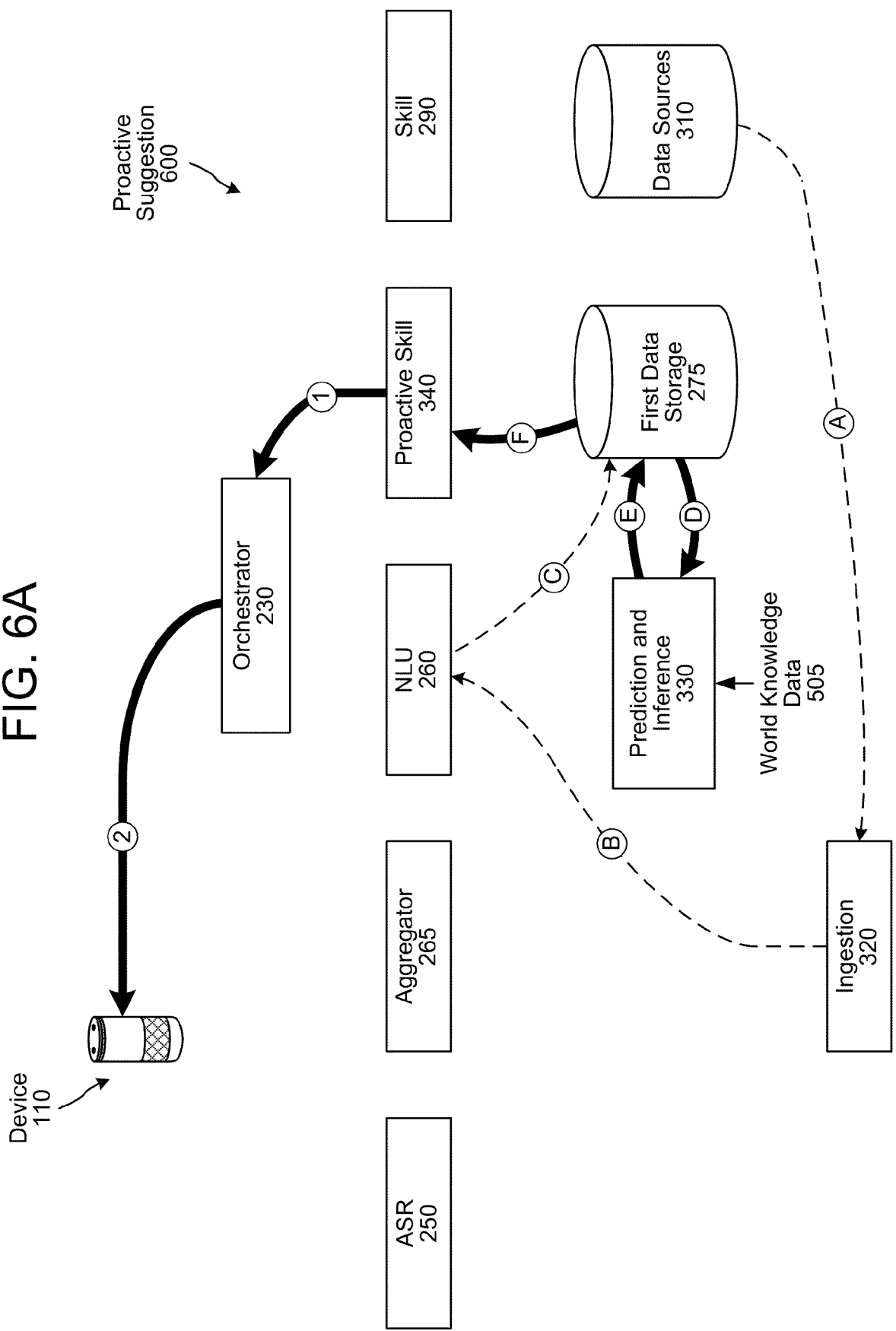

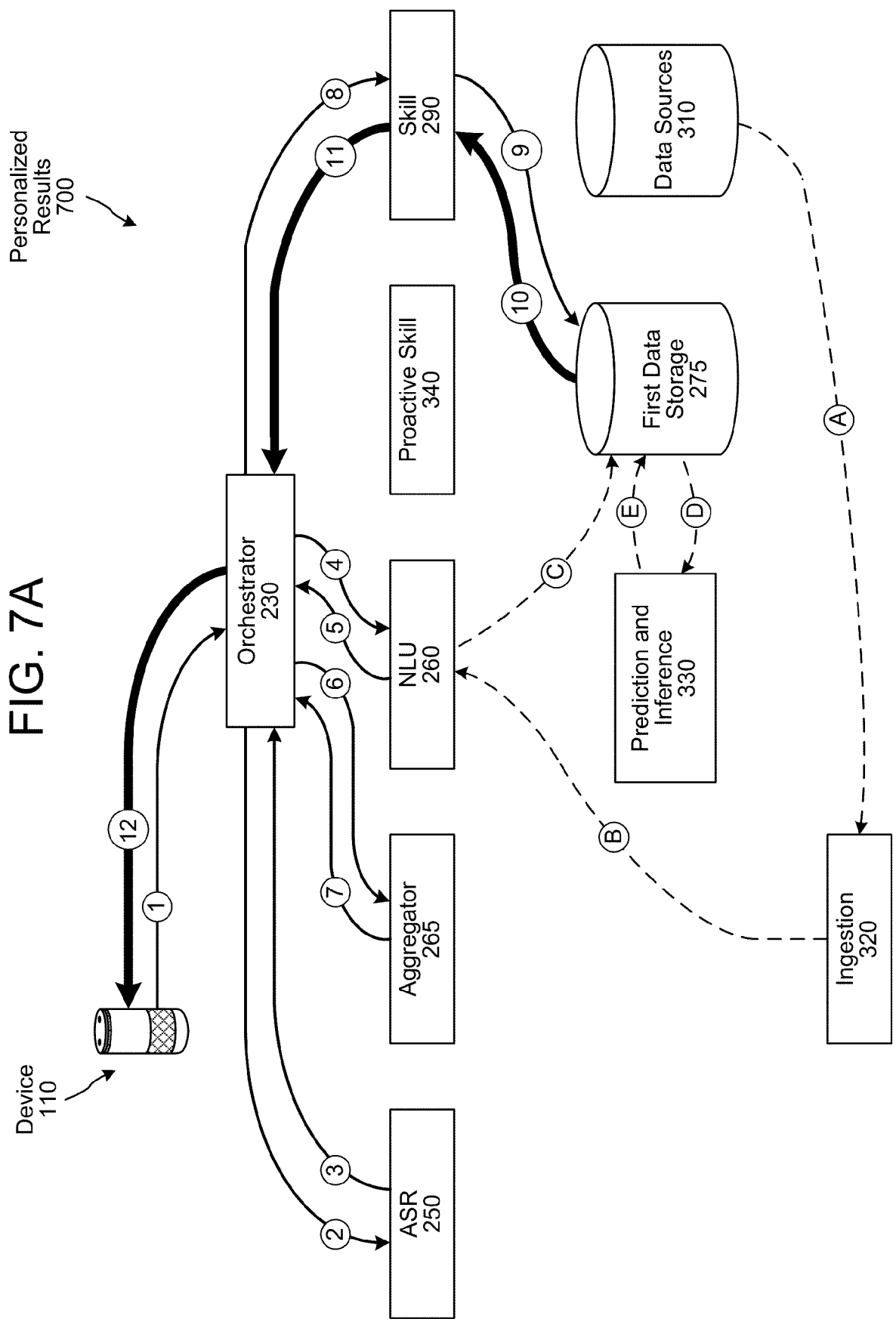

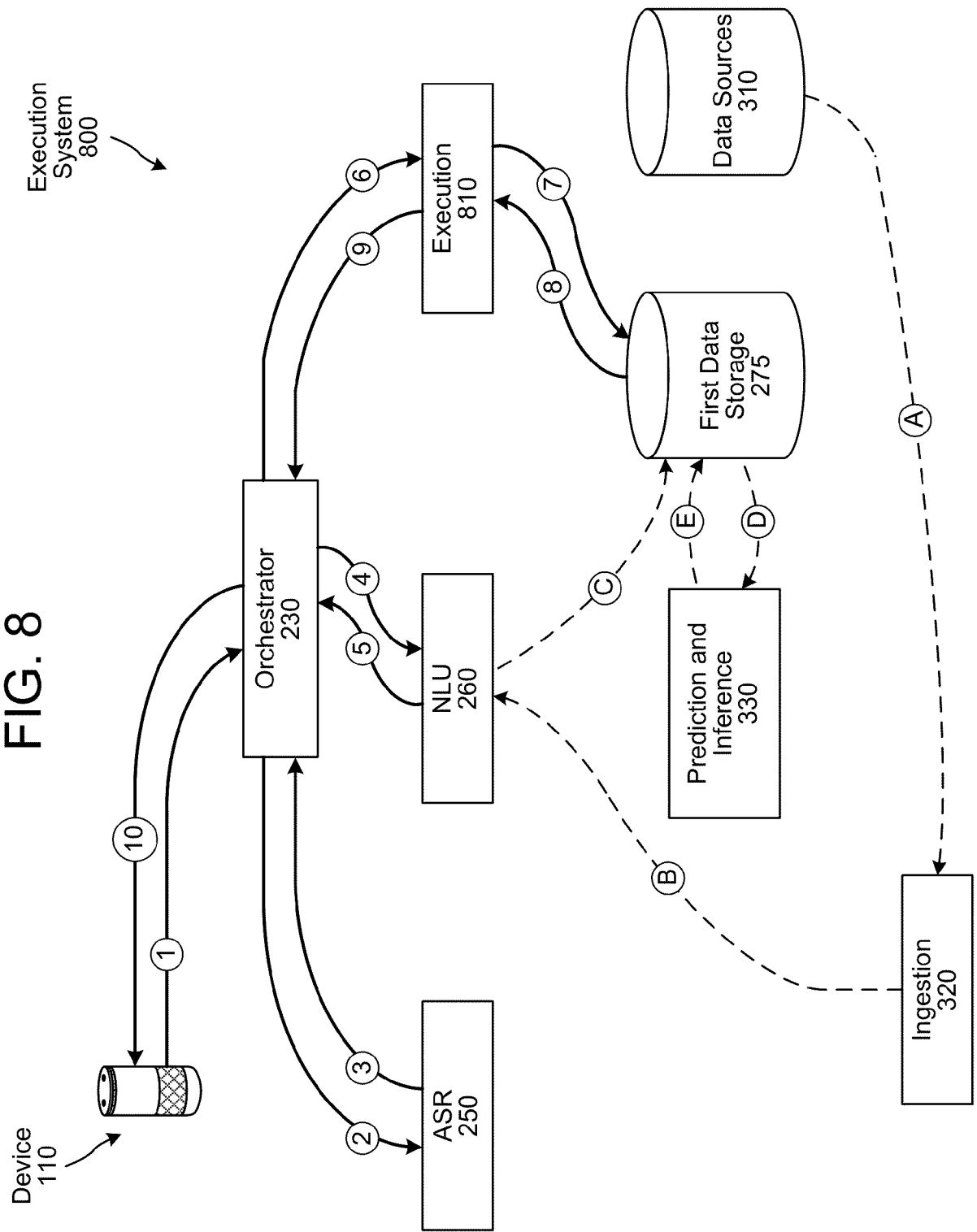

First Data Storage
275

Detailed Permissions
960

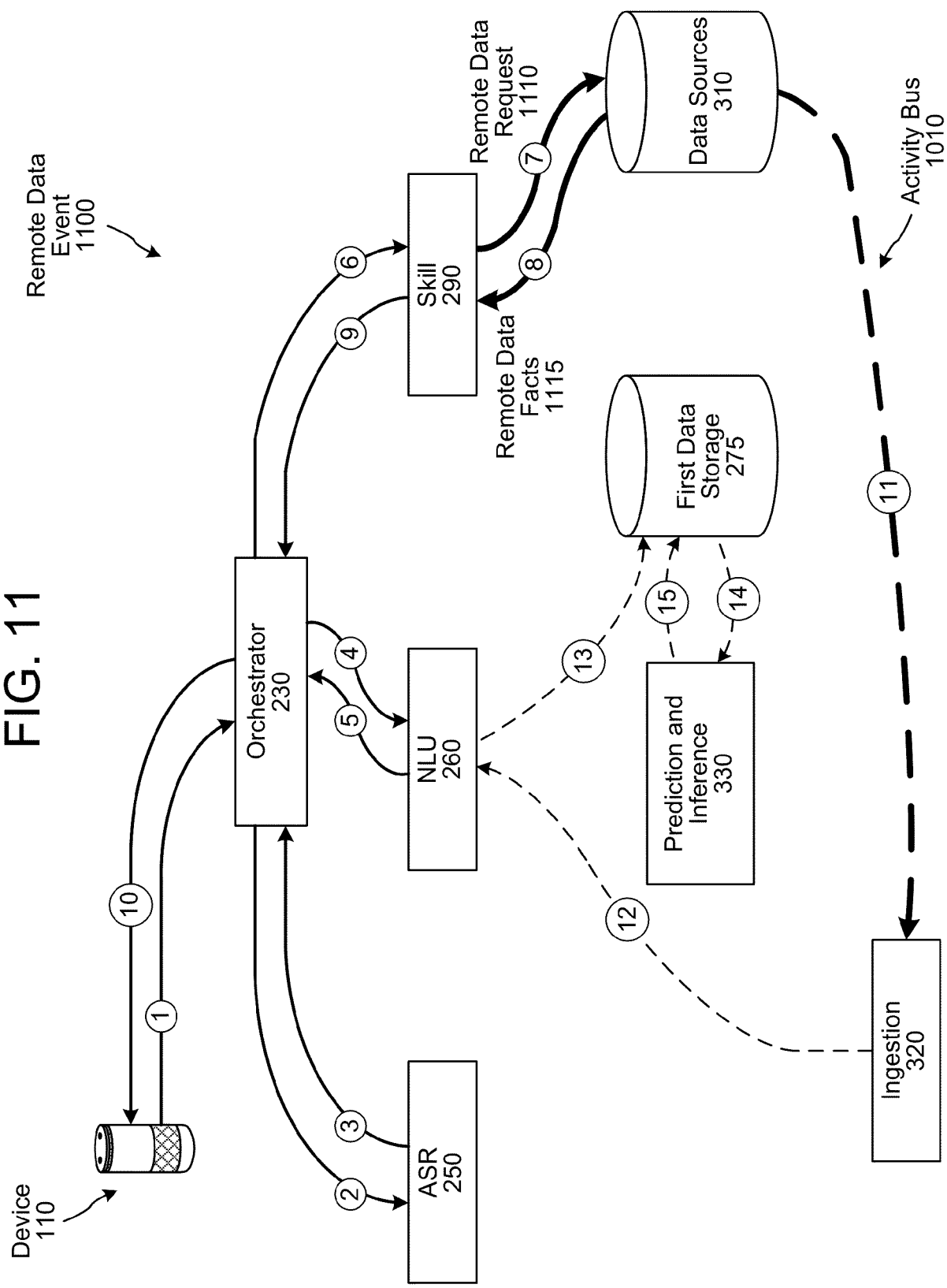

DATA INGESTION AND UNDERSTANDING FOR NATURAL LANGUAGE PROCESSING SYSTEMS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4B illustrate examples of performing ingestion and inference processing to improve results.

FIGS. 5A-5B illustrate examples of ingesting data and correlating data.

FIGS. 6A-6B illustrate examples of performing prediction and inference processing to provide suggestions.

FIGS. 7A-7B illustrate examples of generating personalized results.

FIG. 8 is a component diagram conceptually illustrating how a system ingests data and performs prediction and inference processing.

FIG. 11 illustrates an example of ingesting data from an activity bus.

DETAILED DESCRIPTION

Figure 1:
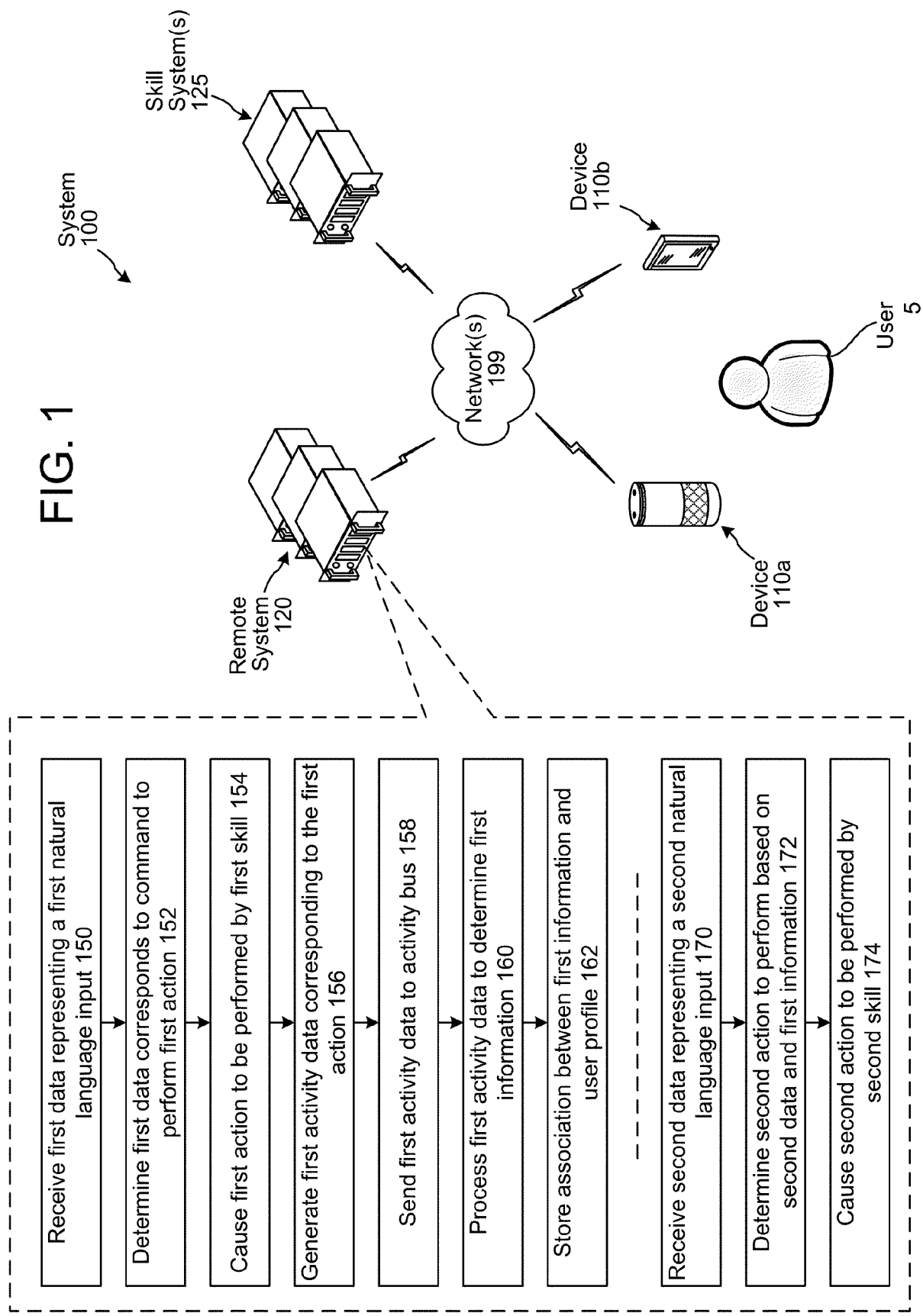
FIG. 1 is a conceptual diagram illustrating a system configured to ingest data and provide personalized results.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). Thus, a system may receive a natural language input, process the natural language input to determine an action to be performed that is responsive to the natural language input, and invoke a skill system to perform the action. For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

To improve a customer experience, the present disclosure improves such systems by providing a mechanism that (e.g., with user permission) ingests data from multiple sources and uses the ingested data to personalize the system response to the user profile. For example, the system may ingest data from multiple different sources and store the ingested data in a single database, enabling the system to access the ingested data when performing speech processing. This enables the system to easily access existing personal data in order to identify correlated information, make inferences and predictions, resolve ambiguous and/or relative terms, store additional information about individual entities, prompt the user when appropriate, and generate improved results. For example, the system may filter results and/or output improved results that are unique to the user profile based on the ingested data. In some examples, the system may proactively suggest actions to perform, generate lists unique to the user profile, among other things based on the inferences and/or other types of predictions.

The system may include several safeguards in order to improve privacy protection for the user profile. For example, the system may request permission from the user prior to ingesting data and may control the type of data and/or the source of data that is ingested. In addition, the system may request permission from the user prior to making inferences and predictions using the ingested data and/or proactively suggesting actions to perform. Additionally or alternatively, the system may control access to the ingested data and other personal information, enabling the user to customize which skills are granted access to which type of information.

FIG. 1 illustrates an example of a system 100 configured to ingest data and provide personalized results. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b) local to a user 5, a natural language processing (NLP) remote system 120, and one or more skill system(s) 125. As illustrated, the one or more devices (110a/110b), the remote system 120, and the skill system(s) 125 may communicate across one or more networks 199. While the user 5 is illustrated as being a human, other types of users (e.g., computing systems) may exist.

FIG. 1 includes a process flow illustrating how the remote system 120 may ingest data and provide personalized results. At some point, the device 110a may receive first data corresponding to a spoken natural language input originating from the user 5. For example, the device 110a may receive audio, generate audio data corresponding to the audio, and send the audio data to the remote system 120. Alternatively, the device 110b may receive a typed natural language input from the user 5. The device 110b may generate text data corresponding to the typed input and may send the text data to the remote system 120.

The device 110 may send the audio data and/or the text data to the remote system 120 via an application that is installed on the device 110 and associated with the remote system 120. An example of such an application is the Amazon Alexa application that may be installed on a smart phone, tablet, or the like.

As illustrated in FIG. 1, the remote system 120 may receive (150), from a device 110, first data representing a first natural language input. The first data may be audio data or text data sent from the device 110a and/or 110b, although the disclosure is not limited thereto.

The remote system 120 may determine (152) that the first data corresponds to a command to perform a first action and may cause (154) a first skill system 125 to perform a first action responsive to the natural language input. For example, for the natural language input "play Adele music," the skill system 125 may cause the device (110a/110b) to output music sung by an artist named Adele. As a further example, for the natural language input "turn on the lights," the skill system 125 may cause "smart" lights, associated with the user 5's profile, to be turned on. In another example, for the natural language input "what is the weather," the skill system 125 may cause the device (110a/110b) to output weather information (for a geographic location corresponding to the device (110a/110b) or represented in the user 5's profile). One skilled in the art will appreciate that the remote system 120 may receive various natural language inputs and, thus, that the foregoing pairings of natural language user inputs and actions are merely illustrative.

In some examples, the natural language input may correspond to a request to store information, such as a reminder, calendar event, and/or other information. To illustrate an example, the natural language input may correspond to an input command such as "Remember that my Mom's birthday is December 12th." Thus, the remote system 120 may cause the first action to be performed by storing an indication representing "My Mom's birthday is December 12th." However, the disclosure is not limited thereto and the natural language input may vary without departing from the disclosure.

In addition to causing the first action to be performed, the remote system 120 may generate (156) first activity data corresponding to the first action and may send (158) the first activity data to an activity bus. The first activity data may include information associated with the first action, such as the first action, an indication of the first skill system 125, first information corresponding to the first action, and/or the like, although the disclosure is not limited thereto.

The activity bus may be a component configured to distribute data regarding system activity associated with the user profile. For example, the activity bus may distribute activity data corresponding to sensor data generated by a sensor of a device 110 (e.g., thermometer data, motion sensor data, proximity data, etc.), processed sensor data generated from the sensor data (e.g., presence data, identity data, trigger data, etc.), an indication of an action performed by the system 100 (e.g., indicating that a first user profile performed a first action using a first skill at a first time), and/or the like, although the disclosure is not limited thereto. Thus, the system 100 may generate activity data for any action performed by the system 100.

To ingest personal data, the remote system 120 may process the activity data associated with the activity bus. For example, the remote system 120 may process (160) the first activity data to determine first information represented in the first activity data and may store (162) the first information in association with the user profile (e.g., an association between the first information and a user profile).

In the example described above, the remote system 120 may identify first information such as that an entity labeled "Mom" is associated with a special occasion (e.g., birthday) on a specific date (e.g., December 12th). Thus, the remote system 120 may identify contact information corresponding to the entity labeled "Mom" and may update the contact information with an attribute indicating that the contact's birthday is December 12th. In some examples, the remote system 120 may create a calendar entry for "Mom's birthday" on December 12th, although the disclosure is not limited thereto.

At a later point in time, the remote system 120 may receive (170) second data representing a second natural language input and may determine (172) a second action to perform based on the second data and the first information associated with the user profile. For example, the remote system 120 may interpret the second natural language input using the first information and other personal data ingested by the remote system 120 to determine the second action that is responsive to the second natural language input. The remote system 120 may then cause (174) a second skill system 125 to perform the second action. For example, in response to a natural language input such as "How many days until my mother's birthday?" the remote system 120 may access the first information to determine that the mother's birthday is December 12th and then calculate a number of days between a current date and December 12th. Thus, the remote system 120 may provide personalized results based on the first information, as described in greater detail below with regard to FIGS. 7A-7B.

While not illustrated in FIG. 1, in some examples the remote system 120 may detect an upcoming event, determine that the first information corresponds to the upcoming event, determine a third action to potentially perform based on the first information, and send output data requesting permission to perform the third action to the device 110. For example, the remote system 120 may detect an upcoming event (e.g., "Mom's birthday," if a calendar event was created, or simply that December 12th is approaching if a calendar event was not created) and may send output data requesting permission to add a reminder to buy a gift for the upcoming event (e.g., "It looks like your mom's birthday is coming up in two weeks. Would you like to add a reminder next week to buy your mom a gift?"). However, the disclosure is not limited thereto, and the output data may request permission to generate a list of potential gifts, a reminder to go grocery shopping or other event planning, and/or the like without departing from the disclosure. Additional examples are described below with regard to FIGS. 6A-6B.

While FIG. 1 illustrates the first data as a natural language input, this is intended for ease of illustration and the disclosure is not limited thereto. In some examples, the remote system 120 may ingest first data that does not correspond to natural language input without departing from the disclosure. For example, the remote system 120 may ingest data corresponding to emails, calendar data, and/or the like, regardless of whether it is represented as a natural language input. Additionally or alternatively, the remote system 120 may ingest structured data and/or unstructured data without departing from the disclosure.

Figure 2:
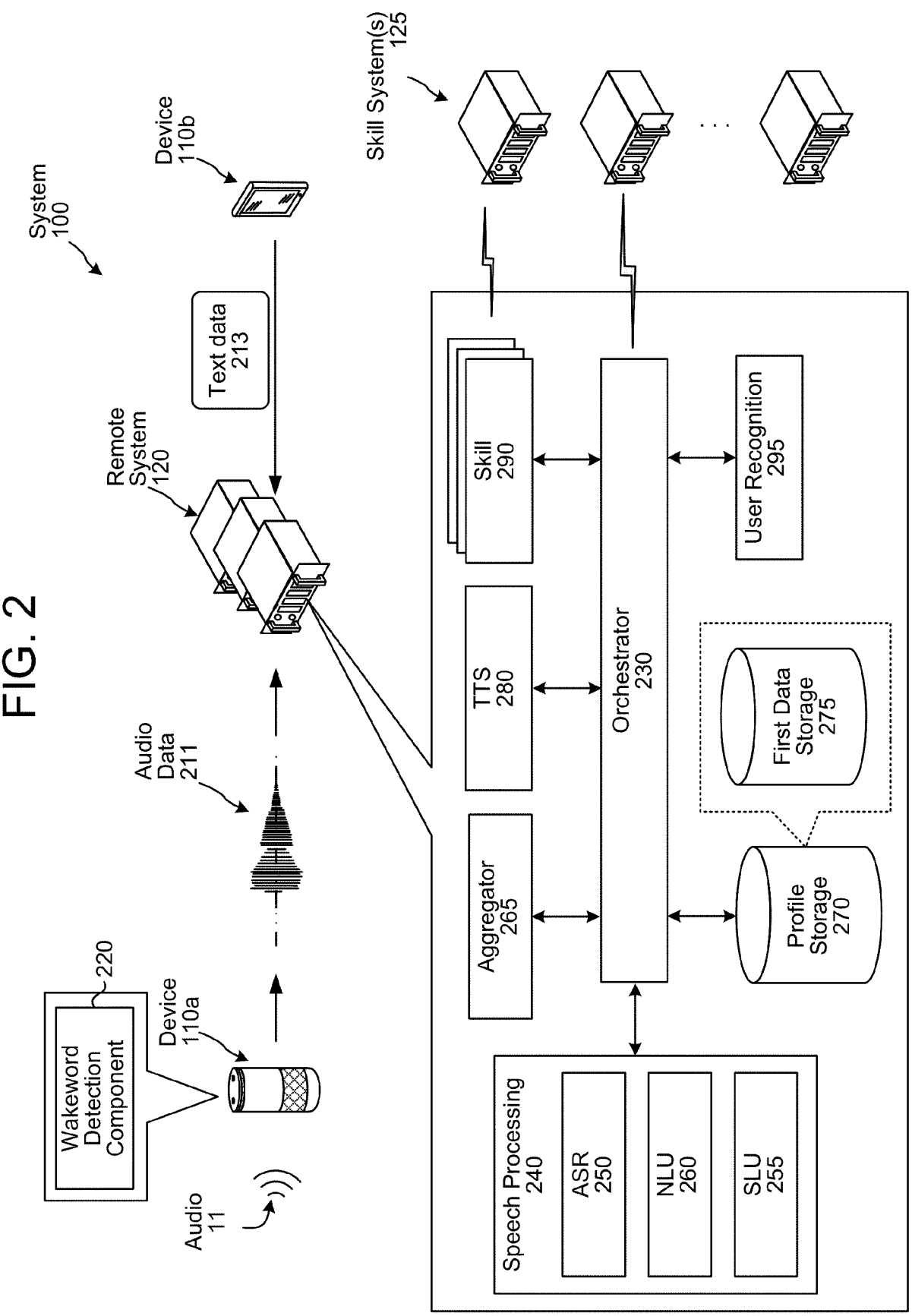
FIG. 2 is a conceptual diagram of components of the system.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the remote system 120. As indicated previously, the device 110a may be configured to detect various wakewords, with each wakeword corresponding to a different assistant. In at least some examples, a wakeword may correspond to a name of an assistant. An example wakeword / assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN) / recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The remote system 120 may include an orchestrator component 230 configured to receive the audio data 211 (and optionally and assistant identifier) from the device 110a. The orchestrator component 230 may send the audio data 211 to a speech processing component 240. In some examples, the speech processing component 240 may include an ASR component 250 and an NLU component 260 that are configured to process the audio data 211 to generate NLU data. However, the disclosure is not limited thereto and in other examples, the speech processing component 240 may include a spoken language understanding (SLU) component 255 that is configured to process the audio data 211 to generate the NLU data. Additionally or alternatively, the speech processing component 240 may include the ASR component 250, the NLU component 260 and/or the SLU component 255 without departing from the disclosure.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the remote system 120, wherein the text data 213 is received by the orchestrator component 230.

The orchestrator component 230 may send text data (e.g., text data output by the ASR component 250 or the received text data 213) to an NLU component 260.

The orchestrator component 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the remote system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent.

The NLU component 260 may output NLU results data (which may include tagged text data, indicators of intent, etc.) to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

As described above, the remote system 120 may perform speech processing using two different components (e.g., the ASR component 250 and the NLU component 260). One skilled in the art will appreciate that the remote system 120, in at least some examples, may implement a spoken language understanding (SLU) component 255 that is configured to process audio data 211 to generate NLU results data without departing from the disclosure.

In some examples, the SLU component 255 may be equivalent to the ASR component 250 and the NLU component 260. While the SLU component 255 may be equivalent to a combination of the ASR component 250 and the NLU component 260, the SLU component 255 may process audio data 211 and directly generate the NLU results data, without an intermediate step of generating text data (as does the ASR component 250). As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. In some examples, the SLU component 255 outputs a most likely NLU hypothesis, or multiple NLU hypotheses in the form of a lattice or an N-best list with individual NLU hypotheses corresponding to confidence scores or other scores (such as probability scores, etc.).

The server(s) 120 may include an aggregator component 265 that receives NLU results data and determines which skill component(s) 290 and/or skill system(s) 125 to the system should call to execute an input command. The aggregator component 265 may be implemented separately from the orchestrator component 230 (as illustrated) or one or more components of the aggregator component 265 may be implemented as part of the orchestrator component 230 without departing from the disclosure.

The orchestrator component 230 may send the NLU results data selected by the aggregator component 265 to an associated skill component 290. For ease of illustration, the NLU results data selected by the aggregator component 265 (e.g., output data sent from the aggregator component 265) may be referred to as intent data in order to distinguish from the NLU results data that is generated by the NLU component 260. However, the intent data may correspond to a portion of the NLU results data (e.g., subset of the NLU results data that is associated with selected interpretations and/or skills) and may therefore be referred to as NLU results data without departing from the disclosure. If the NLU results include multiple NLU hypotheses, the orchestrator component 230 may send a portion of the NLU results corresponding to the top scoring NLU hypothesis to a skill component 290 associated with the top scoring NLU hypothesis. However, the disclosure is not limited thereto, and in some examples the orchestrator component 230 may send a portion of the NLU results data to multiple skill components 290 without departing from the disclosure.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or skill system(s) 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill system(s) 125. The skill system(s) 125 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill system(s) 125 may provide output text data responsive to the present user command.

The remote system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The remote system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition (e.g., user recognition processing) by comparing speech characteristics, in the audio data 211, to stored speech characteristics of users. The user recognition component 295 may additionally or alternatively perform user recognition by comparing biometric data (e.g., fingerprint data, iris data, etc.), received by the remote system 120 in correlation with a natural language input, to stored biometric data of users. The user recognition component 295 may additionally or alternatively perform user recognition by comparing image data (e.g., including a representation of at least a feature of a user), received by the remote system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the remote system 120 and/or other systems.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

As illustrated in FIG. 2, the profile storage 270 may include first data storage component 275 that is configured to store personal data associated with a user profile (e.g., personalized data). For example, the first data storage component 275 may store personal data associated with multiple different personal data repositories, as described in greater detail below. In some examples, the first data storage component 275 may control access to the personal data, enabling the remote system 120 to generate improve system responses using the personal data when the user grants the remote system 120 permission to access the personal data.

While FIG. 2 illustrates the first data storage component 275 as a single database, this is intended for ease of illustration and the disclosure is not limited thereto. Instead, the first data storage component 275 may include a plurality of different databases. Additionally or alternatively, the first data storage component 275 may be decentralized, such that individual databases may be stored at different locations without departing from the disclosure. For example, as described in greater detail below with regard to FIG. 9A, the first data storage component 275 may include individual databases associated with personal knowledge graph(s), contacts, calendar, usage, notes, lists, reminders, wakewords, utterance history, interaction history, and/or the like without departing from the disclosure. Each of these individual databases may be independent from each other, in location and/or processing, but may include personal data and be collectively associated with the first data storage component 275.

In some examples,

As used herein, a "dialog" may refer to data transmissions (such as relating to multiple user inputs and remote system 120 outputs) between the remote system 120 and device(s) 110 that all relate to a single originating user input. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier.

Figure 3:
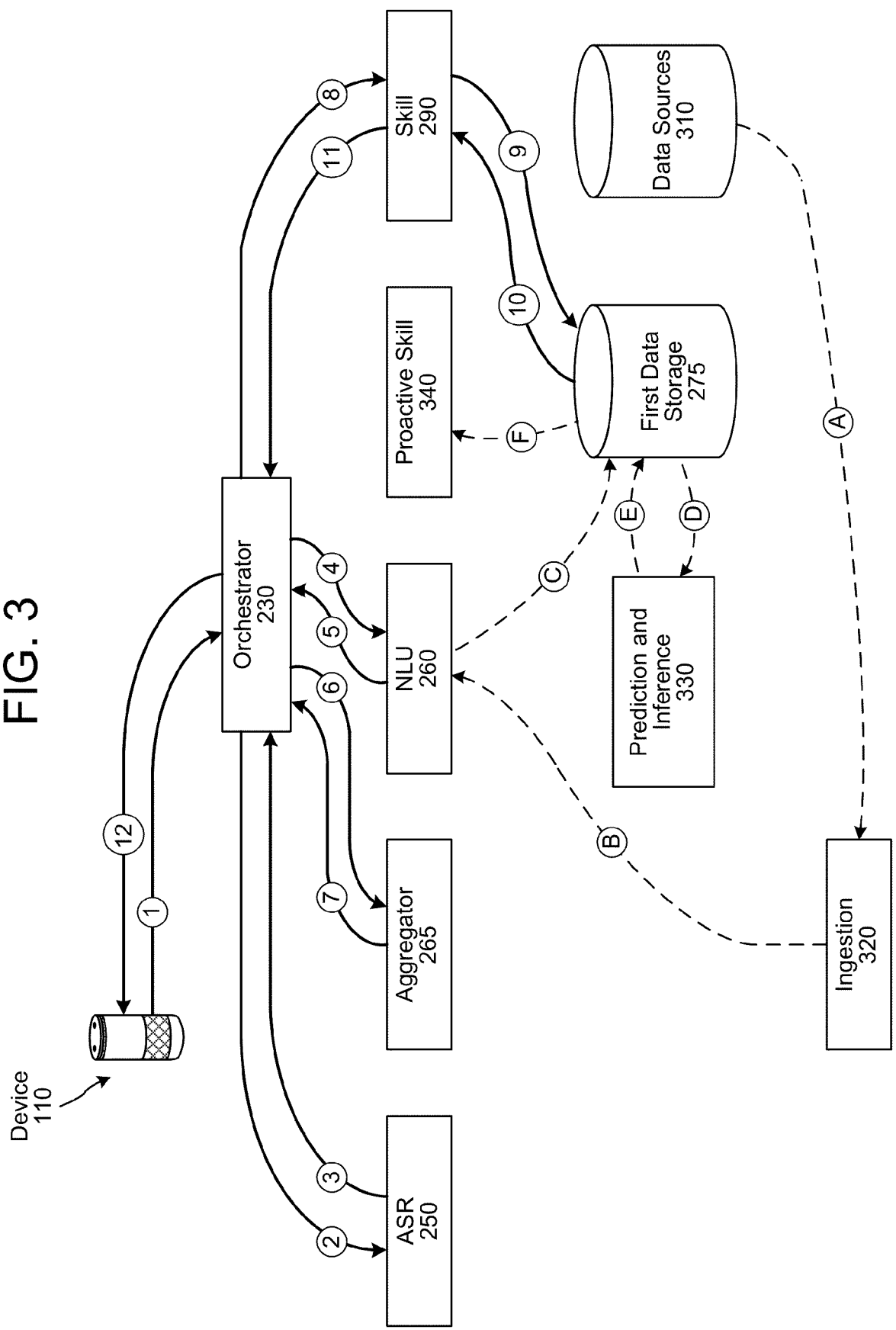
FIG. 3 is a component diagram conceptually illustrating how a system ingests data and performs prediction and inference processing.

FIG. 3 is a component diagram conceptually illustrating how a system ingests data and performs prediction and inference processing. As illustrated in FIG. 3, the remote system 120 may receive an utterance (e.g., user query) (step "1") and may process the utterance using multiple components to generate a system response (step "12"). For example, the device 110 may send input audio data representing the utterance to the remote system 120 (step "1") and the orchestrator component 230 of the remote system 120 may send the input audio data to the ASR component 250 (step "2"). The ASR component 250 may process the input audio data (e.g., perform automatic speech recognition processing) to generate ASR data and may send the ASR data back to the orchestrator component 230 (step "3").

The orchestrator may then send the ASR data to the NLU component 260 (step "4"). The NLU component 260 may process the ASR data (e.g., perform natural language understanding processing) to generate NLU data (e.g., N-best list of possible interpretations) and may send the NLU data back to the orchestrator component 230 (step "5"). The orchestrator component 230 may send the NLU data to the aggregator component 265 (step "6"). The aggregator component 265 may narrow down the N-best list to a subset thereof and generate intent data corresponding to the top interpretation (e.g., a single skill) or the top few interpretations (e.g., several skills) and send the intent data back to the orchestrator component 230 (step "7").

In the example illustrated in FIG. 3, the intent data corresponds to the top interpretation, such that the orchestrator component 230 may send the intent data to a single skill component 290 (step "8") for execution. For example, the skill component 290 may perform an action corresponding to the top interpretation indicated by the intent data. As illustrated in FIG. 3, performing the action may include sending a request for personal data from the first data storage component 275 (step "9") and then receiving the personal data from the first data storage component 275 (step "10"). The skill component 290 may then generate first output data and may send the first output data to the orchestrator component 230 (step "11").

While not illustrated in FIG. 3, in some examples the skill component 290 may send a request for remote data to the data sources 310 and may receive the remote data from the data sources 310. For example, to perform the action responsive to the user query, the skill component 290 may send a request for information to a particular database associated with the skill and/or action and may receive the requested information (e.g., remote data) from the particular database. Examples of the data sources 310 may include a contacts graph, a calendar database, a usage database, a notes database, a lists database, a reminders database, a wakeword database, the skill system(s) 125, a skill database associated with the skill system(s) 125, and/or the like.

To illustrate an example, the user query may correspond to a request for information about a particular airline flight (e.g., "Flight 123"). The remote system 120 may determine that the user query corresponds to a first action (e.g., determine a status of and/or flight information associated with "Flight 123") and may send a command to the skill component 290 to perform the first action. In order to perform the first action, the skill component 290 may send a request for first flight information associated with "Flight 123" to an external database that stores flight information for a plurality of flights. The external database may generate the first flight information and send it back to the skill component 290, which may generate first output data responsive to the user query that includes the first flight information.

In some examples, the skill component 290 may retrieve the personal data from the first data storage component 275 and may use the personal data to request the remote data from the data sources 310. For example, the personal data may include information about the user profile, authorization data, permission data, and/or the like that authorizes the execution component 810 to receive the remote data. For example, the data sources 310 may require identifying information, authentication, and/or the like prior to providing the remote data. Additionally or alternatively, the personal data may include semantic information or contextual information that assists the skill component 290 in determining the remote data to request. Using the example described above, the user query may not indicate an airline associated with "Flight 123" and the skill component 290 may use the personal data to identify the airline before requesting the flight information, although the disclosure is not limited thereto.

The orchestrator component 230 may send the first output data as the system response to the device 110 (step "12"). However, the disclosure is not limited thereto, and in other examples the remote system 120 may perform additional processing not illustrated in FIG. 3 without departing from the disclosure. For example, the orchestrator component 230 may send the first output data to another component (e.g., TTS component 280) to generate second output data (e.g., output audio data representing synthesized speech) and may send the second output data as the system response to the device 110 without departing from the disclosure.

While FIG. 3 illustrates the orchestrator component 230 sending the intent data to a single skill, the disclosure is not limited thereto. In some examples, the intent data may include multiple interpretations (e.g., intents) corresponding to several skills and the orchestrator component 230 may send a portion of the intent data to each of the several skills without departing from the disclosure. For ease of illustration, however, FIG. 3 and the following drawings will only illustrate examples involving a single skill.

To improve the system response generated by the remote system 120, the remote system 120 may personalize the response by ingesting data and performing prediction and inference processing. For example, the remote system 120 may include an ingestion component 320 that accesses personal data stored in multiple different locations (e.g., data sources 310) (step "A") and sends the personal data to the NLU component 260 (step "B"). The NLU component 260 may perform NLU processing to the personal data to generate ingested NLU data and may send the ingested NLU data to the first data storage component 275 (step "C"). Thus, the remote system 120 may generate ingested NLU data from multiple different personal data repositories and may store the ingested NLU data in a single location that is accessible during speech processing (e.g., first data storage component 275).

While FIG. 3 illustrates the ingestion component 320 accessing personal data and sending the personal data to the NLU component 260 for NLU processing, the disclosure is not limited thereto. In some examples, the ingestion component 320 may access personal data and send the personal data directly to the first data storage component 275 without departing from the disclosure. Thus, the ingestion component 320 may ingest personal data without performing NLU processing without departing from the disclosure. For ease of illustration, the ingested NLU data stored in the first data storage component 275 may include personal data that was sent directly from the ingestion component 320 to the first data storage component 275. As will be described in greater detail below with regard to FIGS. 10A-10B, the ingestion component 320 may be configured to ingest both structured data and unstructured data without departing from the disclosure.

Additionally or alternatively, the remote system 120 may process the ingested NLU data using a prediction and inference component 330 that may draw correlations and inferences from the ingested NLU data and/or generate predictions. For example, FIG. 3 illustrates that the first data storage component 275 may send the ingested NLU data to the prediction and inference component 330 (step "D"), the prediction and inference component may process the ingested NLU data to generate inference data and may send the inference data back to the first data storage component 275 (step "E"). Thus, in addition to the ingested NLU data, the first data storage component 275 may include additional information generated from the ingested NLU data to further improve the system response.

To illustrate an example of drawing correlations and inferences, the prediction and inference component 330 may identify that first personal data stored in a first data repository (e.g., Calendar) is associated with second personal data stored in a second data repository (e.g., Reminders, Notes, Contacts, etc.). Thus, the prediction and inference component 330 may associate the first personal data with the second personal data in the first data storage component 275, enabling the remote system 120 to process a user query and generate improved results using both the first personal data and the second personal data. For example, the first personal data may correspond to a birthday event for a family member and the second personal data may correspond to gift ideas for the family member. Thus, if the remote system 120 receives a user query corresponding to purchasing a gift, the remote system 120 may generate a system response directed to purchasing a gift for the family member with the upcoming birthday. Similarly, if the remote system 120 receives a user query corresponding to the family member, the remote system 120 may generate a system response directed to purchasing a gift for the family member.

In some examples, the remote system 120 may resolve personal relationships (e.g., "mom," "brother," "wife," etc.), special occasions (e.g., birthday, anniversary, holidays, etc.), dates (e.g., "March $4^{th}$," "May $30^{th}$," etc.), and/or the like to more fully understand the personal data being processed. For example, the remote system 120 may create entities for people like "Mom" in a personal graph associated with a user profile, such that the entity ("Mom") is synonymous with other terms (e.g., "Mother") as well as an actual contact (e.g., Jane Doe), if known. In addition, the remote system 120 may store an indication of a personal relationship in contact data corresponding to an entity (e.g., indication that Jane Doe corresponds to the user's mother). Additionally or alternatively, the remote system 120 may attach attributes (e.g., birthday, anniversary, etc.) to the entity and potentially create a recurring calendar entry linked back to the source of truth (e.g., the "birthday" attribute attached to the "mother" entity). Thus, in response to a user query of "How many days until my mother's birthday?", the remote system 120 may search through the first data storage component 275 to identify the appropriate contact for the user's "mother," along with the correct date for the birthday associated with the selected contact, and calculate a difference between the current date and the birthday associated with the user's mother.

In some examples, the remote system 120 may generate predictions and proactively suggest actions that the user may perform. As illustrated in FIG. 3, the first data storage component 275 may send prediction data to a proactive skill component 340 (step "F"). The prediction data may include a portion of the inference data generated by the prediction and inference component 330, a portion of the ingested NLU data generated by the NLU component 260, and/or other information without departing from the disclosure. In some examples, the prediction data may be generated by the prediction and inference component 330 and sent to the first data storage component 275 in step "E," although the disclosure is not limited thereto. For example, the prediction and inference component 330 may generate prediction data representing an action to perform and send the prediction data to the proactive skill component 340 via the first data storage component 275. However, the disclosure is not limited thereto, and in other examples the first data storage component 275 may generate the prediction data based on inference data received from the prediction and inference component 330 without departing from the disclosure.

To illustrate an example of generating predictions and proactively suggesting an action that the user may perform, the remote system 120 may associate the first personal data with the second personal data, as discussed above, and make a suggestion based on this association. For example, the first personal data may correspond to an upcoming birthday event for a family member and the second personal data may correspond to gift ideas for the family member. Thus, the remote system 120 may generate an unsolicited system response associated with the upcoming birthday, such as asking if the user would like to purchase a gift for the family member, providing a list of potential gifts to the user, asking if the user would like to set a reminder for buying a gift, asking if the user would like to set a reminder for wishing a happy birthday, and/or the like. For example, the remote system 120 may generate an unsolicited system response corresponding to "It looks like your mother's birthday is coming up in two weeks. Would you like to add a reminder next week to buy your Mom a gift?"

To illustrate another example of generating predictions and proactively suggesting an action that the user may perform, the remote system 120 may identify travel information associated with a trip (e.g., hotel booking, airline booking, calendar entry, etc.) and may offer suggestions to the user. For example, the remote system 120 may be configured to assist the user in planning travel (e.g., booking flights, hotels, restaurants, car rentals, etc.) and/or to integrate with skills that are associated with traveling, improving a user experience when planning travel and/or traveling. Additionally or alternatively, the remote system 120 may suggest activities based on personal preferences, including sports, recreation, restaurants, shows, movies, events with friends, etc. For example, the remote system 120 may identify that the user profile is associated with a certain type of activity (e.g., hiking) and may suggest local destinations or activities based on that activity, although the disclosure is not limited thereto.

As illustrated in the examples described above, ingesting the personal data and/or performing prediction and inference processing may assist the remote system 120 in generating a personalized system response that improves a user experience. In some examples, the prediction and inference component 330, the first data storage component 275, and/or the proactive skill component 340 may run one or more machine learned models that may take as input one or more of the data / information detailed above, and generate the inference data and/or prediction data. The model(s) run by the prediction and inference component 330, the first data storage component 275, and/or the proactive skill component 340 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIGS. 4A-4B illustrate examples of performing ingestion and inference processing to improve results. FIG. 4A illustrates an example of the remote system 120 processing user queries without performing ingestion. As illustrated in FIG. 4A, a first dialog 400 may correspond to a first input command 405 (e.g. "Remember that my Mom's birthday is December 12th") and an action to perform 410. For example, the action to perform may correspond to a command 412 (e.g. "store") and a text string 414 (e.g., "My Mom's birthday is December 12th"), indicating that the first input command 405 is instructing the remote system 120 to store the text string 414. Later, a second dialog 420 may correspond to a second input command 425 (e.g. "When is my Mom's birthday?") and a system response 430 (e.g., "Here is what I found: 'My Mom's birthday is December 12th'") responding to the second input command 425. As illustrated in FIG. 4A, the system response 430 includes the text string 414 that was previously stored by the remote system 120. However, while the remote system 120 can reproduce the text string 414, the remote system 120 did not process the text string 414 and has no understanding of what information is contained within the text string 414.

In contrast, FIG. 4B illustrates an example of the remote system 120 processing user queries after performing ingestion and inference processing. As illustrated in FIG. 4B, ingestion and inference 440 may correspond to multiple steps performed by the remote system 120. For example, the remote system 120 may perform ingestion processing to ingestion input data 445 (e.g., "My Mom's birthday is December 12th") to generate ingestion output data 450. As illustrated in FIG. 4B, the remote system 120 may determine an identifier 452 (e.g., "Mom's"), a special occasion 454 (e.g., "birthday"), and a date 456 (e.g., "December 12th"), enabling the remote system 120 to interpret the ingestion input data 445 as identifying that the user's mother has a birthday on December 12th.

In some examples, the remote system 120 may further process the ingestion output data 450 to determine inference output data 460. For example, the remote system 120 may identify an entity 462 corresponding to the identifier 452 (e.g., "Jane Doe" or UserProfile1), a personal relationship 464 between the entity and the user profile (e.g., "Mom," "Mother," etc.), an attribute 466 (e.g., Birthday: "December 12th") associated with the entity, and/or the like. While FIG. 4B illustrates examples of determining a specific date associated with a birthday, the disclosure is not limited thereto and the remote system 120 may determine any identifier, special occasion, date, entity, personal relationship, attribute, and/or other information indicated by the ingestion input data 445 without departing from the disclosure.

In some examples, the remote system 120 may process the ingestion output data 450, the inference output data 460, and/or other information and may determine action(s) to perform 470. For example, the remote system 120 may perform a first action corresponding to creating a calendar entry for the birthday or a reminder several days before the birthday, although the disclosure is not limited thereto. As illustrated in FIG. 4B, the action(s) to perform 470 may include a command 472 to create a calendar entry (e.g., "Create Calendar Entry"), an event label 474 (e.g., Mother's Birthday") associated with the calendar entry, and a date 476 (e.g., December 12th) for the calendar entry, although the disclosure is not limited thereto.

Based on the ingestion and inference 440, the remote system 120 may generate improved results by understanding the meaning of the text string 414 instead of simply storing the text string 414. For example, a third dialog 480 may correspond to a third input command 485 (e.g. "How many days until my mother's birthday?") and a system response 490 (e.g., "There are 15 days until your mother's birthday") responding to the third input command 485. In this example, the remote system 120 does not simply repeat the text string 414 (e.g., "My Mom's birthday is December 12th"), but is instead capable of advanced processing involving the text string 414, such as determining the mother's birthday and calculating how many days separate a current date and the birthday.

Figure 5B:
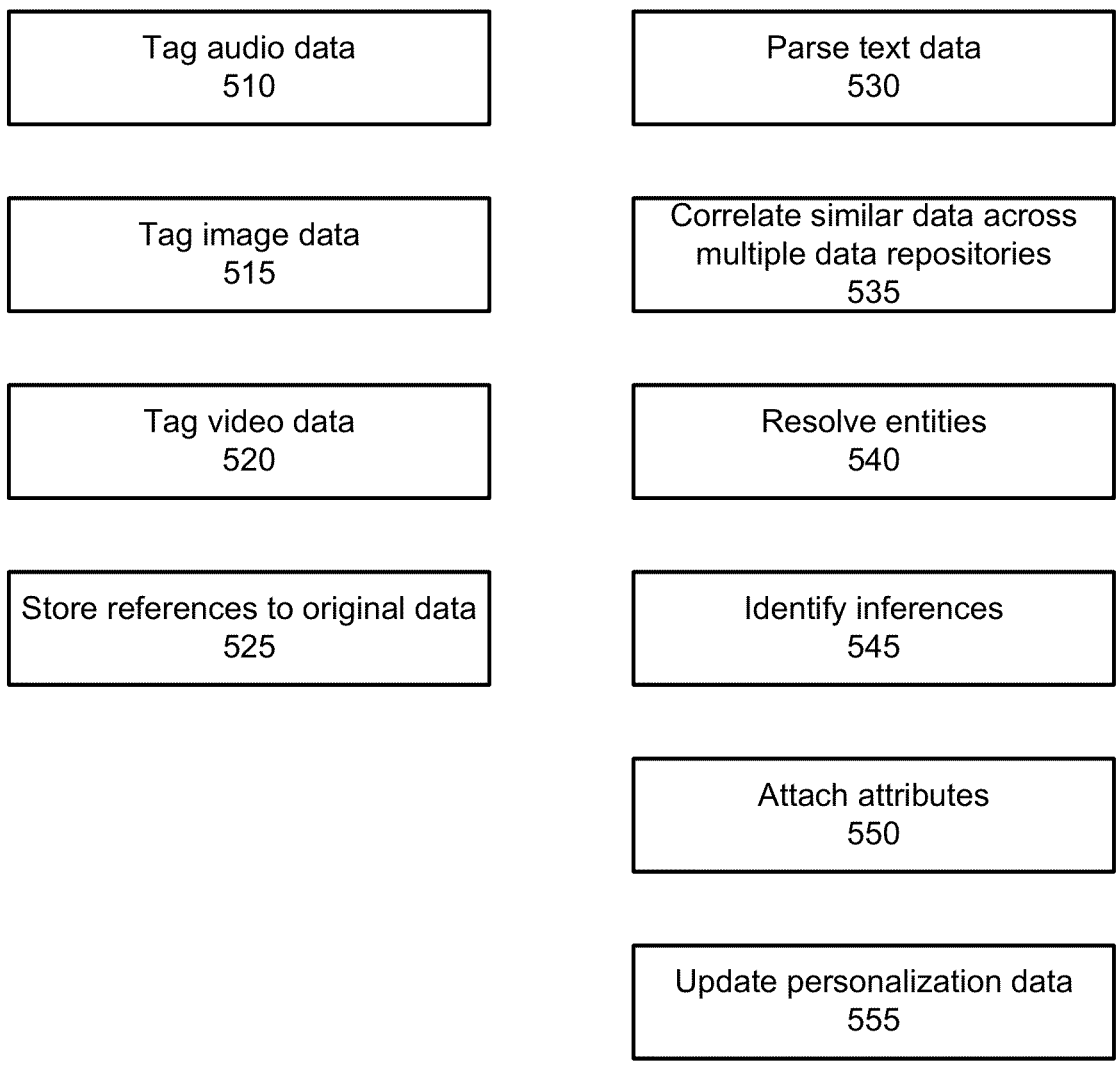

FIGS. 5A-5B illustrate examples of ingesting data and correlating data. As illustrated in FIG. 5A, ingesting data and correlating data corresponds to steps A-E. For example, the remote system 120 may include an ingestion component 320 that accesses personal data stored in multiple different locations (e.g., data sources 310) (step "A") and sends the personal data to the NLU component 260 (step "B"). The NLU component 260 may perform NLU processing to the personal data to generate ingested NLU data and may send the ingested NLU data to the first data storage component 275 (step "C"). Thus, the remote system 120 may generate ingested NLU data from multiple different personal data repositories and may store the ingested NLU data in a single location that is accessible during speech processing (e.g., first data storage component 275).

While FIG. 5A illustrates the ingestion component 320 accessing personal data and sending the personal data to the NLU component 260 for NLU processing, the disclosure is not limited thereto. In some examples, the ingestion component 320 may access personal data and send the personal data directly to the first data storage component 275 without departing from the disclosure. Thus, the ingestion component 320 may ingest personal data without performing NLU processing without departing from the disclosure. For ease of illustration, the ingested NLU data stored in the first data storage component 275 may include personal data that was sent directly from the ingestion component 320 to the first data storage component 275. As will be described in greater detail below with regard to FIGS. 10A-10B, the ingestion component 320 may be configured to ingest both structured data and unstructured data without departing from the disclosure.

Additionally or alternatively, the remote system 120 may process the ingested NLU data using a prediction and inference component 330 that may draw correlations and inferences from the ingested NLU data and/or generate predictions. For example, FIG. 5A illustrates that the first data storage component 275 may send the ingested NLU data to the prediction and inference component 330 (step "D"), the prediction and inference component may process the ingested NLU data to generate inference data and may send the inference data back to the first data storage component 275 (step "E"). Thus, in addition to the ingested NLU data, the first data storage component 275 may include additional information generated from the ingested NLU data to further improve the system response.

In some examples, the prediction and inference component 330 may process the ingested NLU data using additional information, illustrated in FIG. 5A as world knowledge data 505. The world knowledge data 505 may correspond to world knowledge, global information, shared knowledge, and/or the like, which is information that is not unique to the user profile (e.g., not personal data). For example, the prediction and inference component 330 may have knowledge of a schedule associated with the user's favorite sport team, enabling the prediction and inference component 330 to interpret the ingested NLU data and/or generate a suggestion knowing that a game is currently being played or is upcoming. Similarly, the prediction and inference component 330 may have knowledge of a schedule associated with a local venue (e.g., concert schedule), enabling the prediction and inference component 330 to interpret the ingested NLU data and/or generate a suggestion knowing the events being held at the local venue. Thus, the prediction and inference component 330 may process the world knowledge data 505 in addition to the ingested NLU data to generate the inference data.

As illustrated in FIG. 5B, the ingested NLU data and/or the inference data may be used to perform a variety of actions. For example, the remote system 120 may tag audio data 510, tag image data 515, tag video data 520, and/or store references to the original data 525. For example, some of the personal data may correspond to non-textual data (e.g., audio data, image data, and/or video data) and the remote system 120 may process the personal data to generate tags or contextual information identifying what is represented in the non-textual data. To illustrate an example, the remote system 120 may tag audio data 510 by identifying different categories of sounds, speech, individual users, and/or the like represented in the audio data. Similarly, the remote system 120 may image data 515 and/or tag video data 520 by identifying objects, faces, individual users, types of scenes, and/or the like represented in the image data and/or video data. In addition to storing the tagged information, the remote system 120 may also store references to the original data (e.g., the audio data, the image data, and/or the video data) for future processing.

To illustrate an example, the remote system 120 may process image data representing an image of a meal and may store contextual information associated with the image data (e.g., date of capture, objects represented in the image data, that the image data represents a meal, etc.). Later, the remote system 120 may receive a user query (e.g., "What did I have for dinner last week?") and generate a system response based in part on the contextual information. For example, the remote system 120 may identify objects included in the meal and/or display the image of the meal without departing from the disclosure.

When the personal data corresponds to text data, the remote system 120 may parse text data 530, may correlate similar data across multiple data repositories 535, may resolve entities 540, may identify inferences 545, may attach attributes 550, and may update personalization data 555. For example, the remote system 120 may update the personalization data (e.g., personal data) stored in the first data storage component 275, although the disclosure is not limited thereto. Examples of this processing are described in greater detail above with regard to FIG. 4B. For example, the prediction and inference component 330 may identify that first personal data stored in a first data repository (e.g., Calendar) is associated with second personal data stored in a second data repository (e.g., Reminders, Notes, Contacts, etc.), enabling the remote system 120 to process a user query and generate improved results using both the first personal data and the second personal data.

In some examples, the remote system 120 may resolve entities such as personal relationships (e.g., "mom," "brother," "wife," etc.), special occasions (e.g., birthday, anniversary, holidays, etc.), dates (e.g., "March 4$^{th}$," "May 30$^{th}$," etc.), and/or the like to more fully understand the personal data being processed. For example, the remote system 120 may create entities for people like "Mom" in a personal graph associated with a user profile, such that the entity ("Mom") is synonymous with other terms (e.g., "Mother") as well as an actual contact (e.g., Jane Doe), if known. In addition, the remote system 120 may store an indication of a personal relationship in contact data corresponding to an entity (e.g., indication that Jane Doe corresponds to the user's mother). Additionally or alternatively, the remote system 120 may attach attributes (e.g., birthday, anniversary, etc.) to the entity and potentially create a recurring calendar entry linked back to the source of truth (e.g., the "birthday" attribute attached to the "mother" entity).

While not illustrated in FIG. 5B, the remote system 120 may only perform ingestion and/or inference processing on personal data that the user profile has authorized the remote system 120 to access. As will be described in greater detail below with regard to FIGS. 8A-8B, the remote system 120 may protect private information and may enable the user profile to set specific permissions to control access to personal data. For example, the remote system 120 may ingest first personal data associated with a first personal data repository and/or first skill, but may not be granted access to second personal data associated with a second personal data repository and/or second skill without departing from the disclosure. Additionally or alternatively, the remote system 120 may control access to personal information based on a skill or action to perform. For example, the remote system 120 may ingest both the first personal data and the second personal data, but may only allow specific skills to access the first personal data without departing from the disclosure. In some examples, the remote system 120 may request specific consent from a user prior to ingesting the first personal data and/or sharing the first personal data with a specific skill, although the disclosure is not limited thereto.

Figure 6B:
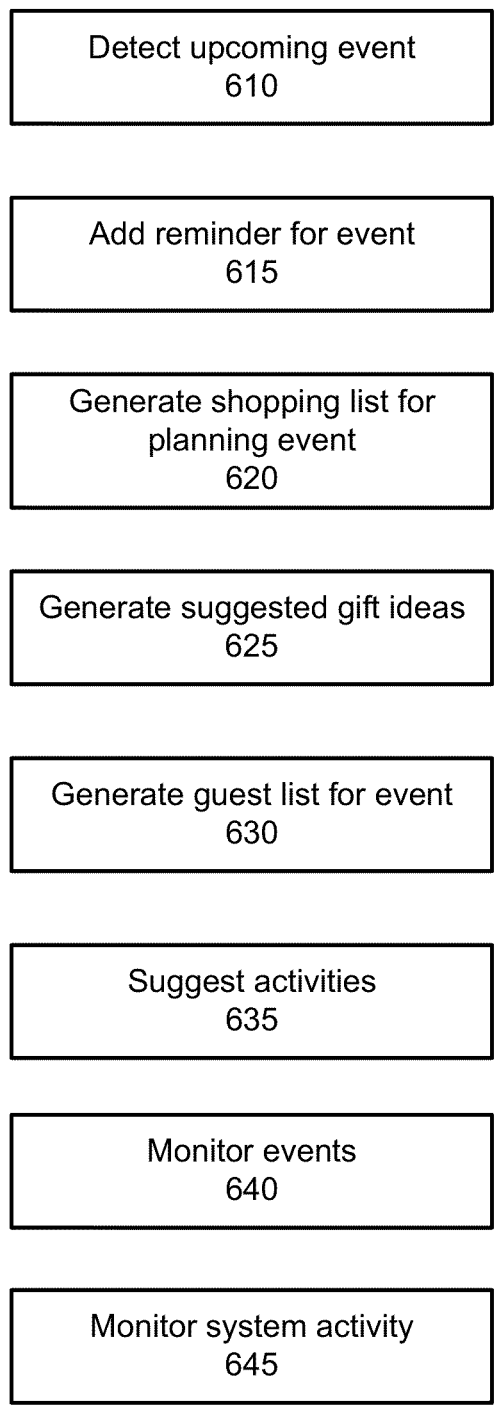

FIGS. 6A-6B illustrate examples of performing prediction and inference processing to provide suggestions. As illustrated in FIG. 6A and described above, the first data storage component 275 may send the ingested NLU data to the prediction and inference component 330 (step "D"), the prediction and inference component may process the ingested NLU data to generate inference data and may send the inference data back to the first data storage component 275 (step "E"). Thus, in addition to the ingested NLU data, the first data storage component 275 may include additional information generated from the ingested NLU data to further improve the system response.

In addition, the first data storage component 275 may send prediction data to a proactive skill component 340 (step "F"). The prediction data may include a portion of the inference data generated by the prediction and inference component 330, a portion of the ingested NLU data generated by the NLU component 260, and/or other information without departing from the disclosure. In some examples, the prediction data may be generated by the prediction and inference component 330 and sent to the first data storage component 275 in step "E," although the disclosure is not limited thereto. For example, the prediction and inference component 330 may generate prediction data representing an action to perform and send the prediction data to the proactive skill component 340 via the first data storage component 275. However, the disclosure is not limited thereto, and in other examples the first data storage component 275 may generate the prediction data based on inference data received from the prediction and inference component 330 without departing from the disclosure.

FIG. 6A illustrates an example of generating a proactive suggestion 600 in response to receiving the prediction data in step F. For example, the proactive skill component 340 may generate output data based on the prediction data, as described in greater detail below with regard to FIG. 6B. As illustrated in FIG. 6A, the proactive skill component 340 may send the output data to the orchestrator component 230 (step "1") and the orchestrator component 230 may send the output data to the device 110 (step "2"). While FIG. 6A illustrates the orchestrator component 230 sending the output data directly to the device 110, the disclosure is not limited thereto and in some examples the orchestrator component 230 may send first output data received from the proactive skill component 340 to another component (e.g., TTS component 280) to generate second output data and the orchestrator component 230 may send the second output data to the device 110 without departing from the disclosure. For example, the first output data may correspond to text data and the second output data may correspond to audio data representing synthesized speech corresponding to the text data, although the disclosure is not limited thereto.

In some examples, the output data may correspond to a completed action. For example, the output data may correspond to a notification to the user, such as an indication regarding an upcoming event. In other examples, however, the output data may correspond to an action to perform and/or a request to perform an action. For example, the remote system 120 may send a request to the device 110 to request permission to perform an action. To illustrate an example, the remote system 120 may request whether the user would like to add a reminder for an upcoming event. Additionally or alternatively, the output data may correspond to a list of information or a request for permission to generate a list of information, such as a shopping list, suggested gift ideas, a guest list, suggested activities, and/or the like, as described in greater detail below.

As illustrated in FIG. 6B, the ingested NLU data and/or the inference data may be used to perform a variety of actions. For example, the remote system 120 may detect an upcoming event 610, add a reminder for the event 615, generate a shopping list for planning an event 620, generate suggested gift ideas 625, generate a guest list for the event 630, suggest activities 635 based on user preferences, monitor events 640, monitor system activity 645, and/or the like without departing from the disclosure.

The remote system 120 may detect an upcoming event 610 such as a birthday, anniversary, graduation, holiday, family visit, social gathering (e.g., family dinner, neighborhood event, party, etc.), venue event (e.g., concert, live show, play, etc.), and/or the like. Based on the upcoming event detected, the remote system 120 may offer different suggestions. For most upcoming events, the remote system 120 may suggest adding a reminder for the event 615 in addition to the actual event reminder. For example, the remote system 120 may suggest adding a reminder to buy a gift or to plan the event several days before the date of the event, enabling the user to prepare for the upcoming event appropriately.

In some examples, the upcoming event may be associated with a party that the user is hosting, such as a birthday party or graduation party for a family member. When this occurs, the remote system 120 may generate a shopping list for planning the event 620. For example, the remote system 120 may detect the upcoming event and suggest that the user purchase party decorations, paper plates and plastic utensils, and/or the like. In other examples, the upcoming event may be associated with a meal that the user is hosting, such as a family dinner, large barbecue, neighborhood pot luck, and/or the like. In this example, the remote system 120 may detect the upcoming event and suggest that the user purchase products corresponding to the specific event and/or suggest a grocery list for the user to use when grocery shopping. Additionally or alternatively, the upcoming event may be associated with guests visiting, such as a family visit, a holiday, and/or the like. In this example, the remote system 120 may generate a shopping list of groceries or other household goods that may be useful during the visit.

In addition to generating a shopping list for planning the event 620, the remote system 120 may also generate a guest list for the event 630. For example, the remote system 120 may receive information associated with the event (e.g., event data) from one or more data sources 310 and may extract the guest list from the event data. To illustrate an example, if the user organized an event using social networking, the remote system 120 may receive authorization from the user profile to access the event data and may generate the guest list for the event based on the event data. Additionally or alternatively, the remote system 120 may generate the guest list based on previous events (e.g., recurring events), based on invitations sent out for the event (e.g., based on messages such as emails, text messages, etc.), and/or the like.

In some examples, the upcoming event may be associated with gifts, such as a birthday party, graduation party, anniversary, holiday, and/or the like. When the upcoming event is associated with gift-giving, the remote system 120 may detect the upcoming event and generate suggested gift ideas 625 corresponding to the event. For example, the remote system 120 may determine an identity associated with the event (e.g., person having the birthday or graduating, partner associated with the anniversary, family members associated with the holiday, etc.) and may generate suggested gift ideas personalized based on the identity. Thus, if the user's child is having a birthday, the remote system 120 may generate the suggested gift ideas 625 based on previous shopping history, wish lists, and/or other information associated with the user's child and/or an age range corresponding to the user's child. Similarly, if the remote system 120 detects an upcoming anniversary, the remote system 120 may generate the suggested gift ideas 625 based on the type of anniversary, previous purchase history, and/or the like.

In some examples, the remote system 120 may detect an upcoming event and suggest activities 635 based on user preferences. For example, if the upcoming event is a venue event (e.g., concert, theater, amusement park, etc.), the remote system 120 may suggest activities associated with the event, driving directions to the event, and/or the like. Additionally or alternatively, if the upcoming event is associated with guests visiting or a vacation, the remote system 120 may suggest activities to entertain the guests (e.g., based on a first location associated with the user profile) or to do while on vacation (e.g., based on a second location associated with the vacation). For example, the remote system 120 may suggest local attractions, areas to explore, places to visit, hiking destinations, commercial activities (e.g., restaurants, tickets, amusement parks), and/or the like without departing from the disclosure.

In some examples, the remote system 120 may monitor events 640 associated with the user profile. For example, the remote system 120 may identify an upcoming event and may monitor a status of the event in order to provide the user with relevant updates associated with the event. Additionally or alternatively, the remote system 120 may identify the upcoming event and provide suggestions associated with the event. For example, the remote system 120 may identify an upcoming flight and may monitor the flight status, generate a system response suggesting that the user check in for the flight, generate a proactive action suggesting that the user download a new book or movie, and/or the like. As illustrated in FIG. 6A, the prediction and inference component 330 may process world knowledge data 505 when monitoring an event. For example, the prediction and inference component 330 may receive the world knowledge data 505 and use the world knowledge data 505 to monitor public information, such as tracking local weather, the flight status, information about a venue, traffic information, etc.

In some examples, the remote system 120 may monitor system activity 645, such as an activity bus, changes in personal data stored in the first data storage component 275, and/or the like. For example, when incoming personal data conflicts with or updates existing personal data, the remote system 120 may identify that a change occurred and treat this change as a trigger to perform an action. Additionally or alternatively, the remote system 120 may monitor activity data associated with the activity bus and certain activity data may trigger the remote system 120 to perform an action, as described in greater detail below with regard to FIGS. 10A-11. In some examples, the action may correspond to a background action performed by the remote system 120, such as monitoring an event for additional changes. Additionally or alternatively, the action may correspond to a proactive action, such as generating a notification indicating the change and/or suggesting an additional action to perform.

While FIG. 6B illustrates examples of proactive actions that the remote system 120 may suggest, these are intended to conceptually illustrate examples and the disclosure is not limited thereto. Instead, the remote system 120 may perform and/or suggest additional actions not illustrated in FIG. 6B without departing from the disclosure.

While not illustrated in FIG. 6B, the remote system 120 may only perform and/or suggest actions based on personal data that the user profile has authorized the remote system 120 to access. As will be described in greater detail below with regard to FIGS. 8A-8B, the remote system 120 may protect private information and may enable the user profile to set specific permissions to control access to personal data. For example, the remote system 120 may perform and/or suggest actions based on first personal data associated with a first personal data repository and/or first skill, but may not be granted access to second personal data associated with a second personal data repository and/or second skill without departing from the disclosure. Additionally or alternatively, the remote system 120 may control access to personal information based on the type of action to perform or suggest. For example, the remote system 120 may generate a guest list based on both the first personal data and the second personal data, but may only generate suggested gift ideas based on the first personal data. Thus, the remote system 120 may take steps to improve the system response while protecting private information associated with the user profile.

Figure 7B:
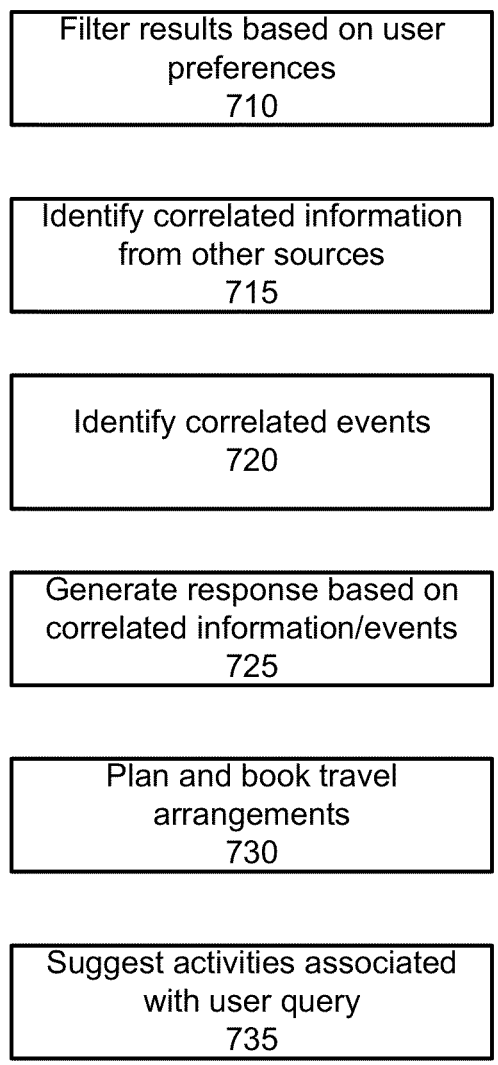

FIGS. 7A-7B illustrate examples of generating personalized results. As described above with regard to FIG. 3, the remote system 120 may perform steps A-E to ingest personal data and generate ingested NLU data and/or inference data that is stored in the first data storage component 275. Similarly, as described above with regard to FIG. 3, the remote system 120 may receive a user query (step "1"), may process the user query to generate intent data (step "2" through step "7"), and the orchestrator component 230 may send the intent data to the skill component 290 (step "8") for execution.

As illustrated in FIG. 7A, the skill component 290 may receive the intent data from the orchestrator component 230, may send a request for personal data from the first data storage component 275 (step "9") and then receive the personal data from the first data storage component 275 (step "10"). The personal data may include the ingested NLU data and/or the inference data received in steps "C" and "E" described above. The skill component 290 may process the intent data using the personal data to generate output data and may send the output data to the orchestrator component 230 (step "11"), which may send the output data as the system response to the device 110 (step "12"). However, the disclosure is not limited thereto and the remote system 120 may perform additional processing not illustrated in FIG. 7A without departing from the disclosure, as described in greater detail above.

As illustrated by steps 10-12 being emboldened in FIG. 7A, the remote system 120 may generate personalized results based on the personal data stored in the first data storage component 275. For example, the remote system 120 may filter results based on user preferences 710, identify correlated information from other sources 715, identify correlated events 720, generate a system response based on the correlated information/events 725, plan and book travel arrangements 730, suggest activities associated with the user query 735, and/or the like, as illustrated in FIG. 7B.

The remote system 120 may filter results based on user preferences 710 by taking into account the personal data ingested from a variety of personal data repositories and stored in the first data storage component 275. Thus, the remote system 120 may filter the results using several pieces of information that would normally be stored in separate locations and not accessible to the skill component 290 during speech processing. For example, the personal data may include information associated with calendar(s), list(s), note(s), and/or other data sources, enabling the skill component 290 to identify relevant information from more than a single source.

To illustrate an example, in response to a user query requesting information about local restaurants (e.g., "Help me find a place to eat"), the skill component 290 may filter local restaurants based on user preferences instead of simply displaying all local restaurants or displaying local restaurants within a certain distance from a location of the user. For example, the skill component 290 may identify restaurants previously visited by the user (e.g., either specific locations previously visited or a chain restaurant that the user previously visited at a different location), types of restaurants that the user prefers (e.g., culture-specific restaurants such as Mexican, Chinese, Italian, etc. restaurants, fast food restaurants, pubs/taverns, family restaurants, etc.), restaurants within a certain budget (e.g., fine dining restaurants while on vacation, mid-priced restaurants when planning a reservation from home, affordable restaurants when planning a reservation while out of the house, etc.), restaurants highly rated according to a rating system associated with the user profile (e.g., specific rating organization, community rankings, recommendations made by friends on social media, and/or the like), and/or using other information. Thus, the remote system 120 may generate a system response suggesting particular restaurants that the user is likely to enjoy instead of listing restaurants based on proximity to a location of the user.

To illustrate another example, in response to a user query associated with weekend activities and/or vacation planning (e.g., "What are some local attractions?" or "What are some activities we can do?"), the skill component 290 may filter local attractions and/or activities based on user preferences instead of simply displaying all local attractions or displaying local attractions within a certain distance from a location of the user. For example, the skill component 290 may identify types of activities based on user preferences associated with the user profile, such as preferred sports, recreation, restaurants, shows, movies, events, and/or the like. Thus, the skill component 290 may generate output data representing potential activities that the user may enjoy.

In some examples, in response to a user query associated with purchasing products (e.g., "Help me discover new products"), the skill component 290 may filter potential products based on user preferences, upcoming events (e.g., upcoming birthdays, holidays, anniversaries, etc.), previous purchase history, and/or the like without departing from the disclosure. Thus, the skill component 290 may search within the personal data stored in the first data storage component 275 to personalize the results for the user.

If the user query indicates a particular entity (e.g., recipient of a gift), the skill component 290 may filter potential products based on information included in the first data storage component 275 that is associated with the specified entity. For example, the skill component 290 may identify a user-created list of gift ideas for the entity, estimate an age range or type of gift associated with the entity, determine common interests associated with the entity (e.g., if the entity is associated with specific types of events, like outdoor activities, the skill component 290 may identify gifts associated with the type of event), determine common gifts associated with an event corresponding to the entity (e.g., birthday gifts, graduation gifts, etc.), and/or the like without departing from the disclosure.

As discussed above, the remote system 120 may identify correlated information from other sources 715, identify correlated events 720, and/or generate a system response based on the correlated information/events 725. For example, the system response described above may be determined based on the correlated information from multiple separate data sources and/or the correlated events without departing from the disclosure. Additionally or alternatively, the remote system 120 may determine the user preferences by identifying correlated information from other sources and/or correlated events without departing from the disclosure.

In addition to the examples above of providing personalized results for potential activities, the remote system 120 may also plan and book travel arrangements 730 and/or suggest activities associated with the user query 735. For example, the remote system 120 may assist with common tasks involved in planning travel and/or be integrated with skills such that the remote system 120 can search and book flights, hotels, restaurants, car rentals, etc. To illustrate an example, the remote system 120 may receive a departure location and a destination, dates of travel, and/or additional information associated with an upcoming trip. Based on this information, the remote system 120 may identify airlines preferred by the user profile, find the cheapest flights for air travel to the destination within the dates of travel, and send output data indicating the cheapest available flights to the device 110. Similarly, the remote system 120 may assist with planning and booking any other activities associated with the trip.

In some examples, the remote system 120 may suggest activities associated with the user query 735. For example, if the user query corresponds to the upcoming trip, the remote system 120 may suggest activities to do that are associated with the destination. Additionally or alternatively, if the user query is associated with an event in a distant location from a home address associated with the user profile (e.g., a concert two hours away from home), the remote system 120 may suggest that the user book a hotel room and/or provide hotel booking information.

While FIG. 7B illustrates some examples of providing personalized results using the personal data stored in the first data storage component 275, the disclosure is not limited thereto and the remote system 120 may generate personalized results using the personal data using any technique known to one of skill in the art without departing from the disclosure.

FIG. 8 is a component diagram conceptually illustrating how a system ingests data and performs prediction and inference processing. The execution system 800 illustrated in FIG. 8 includes many of the components illustrated in FIG. 3, with the exception of the aggregator component 265, the proactive skill component 340, and the skill component 290. Instead, FIG. 8 illustrates that the output data generated by the NLU component 260 is input to an execution component 810 that is configured to perform an action. While the execution component 810 may correspond to a skill component 290, the disclosure is not limited thereto and the execution component 810 may correspond to any component included in the remote system 120 and/or the skill system(s) 125 without departing from the disclosure.

As illustrated in FIG. 8, the remote system 120 may receive an utterance (e.g., user query) (step "1") and may process the utterance using multiple components to generate a system response (step "10"). For example, the device 110 may send input audio data representing the utterance to the remote system 120 (step "1") and the orchestrator component 230 of the remote system 120 may send the input audio data to the ASR component 250 (step "2"). The ASR component 250 may process the input audio data (e.g., perform automatic speech recognition processing) to generate ASR data and may send the ASR data back to the orchestrator component 230 (step "3").

The orchestrator may then send the ASR data to the NLU component 260 (step "4"). The NLU component 260 may process the ASR data (e.g., perform natural language understanding processing) to generate NLU data (e.g., N-best list of possible interpretations) and may send the NLU data back to the orchestrator component 230 (step "5"). The orchestrator component 230 may send the NLU data to the execution component 810 (step "6") and the execution component 810 may perform an action indicated by the NLU data. While FIG. 8 illustrates the orchestrator component 230 sending the NLU data to a single execution component 810, the disclosure is not limited thereto and the orchestrator component 230 may send the NLU data (or a portion of the NLU data) to two or more execution components 810 without departing from the disclosure.

As illustrated in FIG. 8, performing the action may include the execution component 810 sending a request for personal data from the first data storage component 275 (step "7"), receiving the personal data from the first data storage component 275 (step "8"), generating first output data based on the personal data, and then sending the first output data to the orchestrator component 230 (step "9"). For example, the execution component 810 may include a portion of the personal data in the first output data, may process the personal data to generate the first output data that is responsive to the user query, may use the personal data to request additional data responsive to the user query, and/or the like without departing from the disclosure.

While not illustrated in FIG. 8, in some examples the execution component 810 may send a request for remote data to the data sources 310 and may receive the remote data from the data sources 310. For example, to perform the action responsive to the user query, the execution component 810 may send a request for information to a particular database associated with the action and may receive the requested information (e.g., remote data) from the particular database. Examples of the data sources 310 may include a contacts graph, a calendar database, a usage database, a notes database, a lists database, a reminders database, a wakeword database, the skill system(s) 125, a skill database associated with the skill system(s) 125, and/or the like.

To illustrate an example, the user query may correspond to a request for information about a particular airline flight (e.g., "Flight 123"). The remote system 120 may determine that the user query corresponds to a first action (e.g., determine a status of and/or flight information associated with "Flight 123") and may send a command to the execution component 810 to perform the first action. In order to perform the first action, the execution component 810 may send a request for first flight information associated with "Flight 123" to an external database that stores flight information for a plurality of flights. The external database may generate the first flight information and send it back to the execution component 810, which may generate first output data responsive to the user query that includes the first flight information.

In some examples, the execution component 810 may retrieve the personal data from the first data storage component 275 and may use the personal data to request the remote data from the data sources 310. For example, the personal data may include information about the user profile, authorization data, permission data, and/or the like that authorizes the execution component 810 to receive the remote data. For example, the data sources 310 may require identifying information, authentication, and/or the like prior to providing the remote data. Additionally or alternatively, the personal data may include semantic information or contextual information that assists the execution component 810 in determining the remote data to request. Using the example described above, the user query may not indicate an airline associated with "Flight 123" and the execution component 810 may use the personal data to identify the airline before requesting the flight information, although the disclosure is not limited thereto.

After receiving the first output data from the execution component 810, the orchestrator component 230 may send the first output data as the system response to the device 110 (step "10"). However, the disclosure is not limited thereto, and in other examples the remote system 120 may perform additional processing not illustrated in FIG. 8 without departing from the disclosure. For example, the orchestrator component 230 may send the first output data to another component (e.g., TTS component 280) to generate second output data (e.g., output audio data representing synthesized speech) and may send the second output data as the system response to the device 110 without departing from the disclosure.

While FIG. 8 illustrates the orchestrator component 230 sending the NLU data to a single execution component 810, the disclosure is not limited thereto. In some examples, the NLU data may include multiple interpretations (e.g., intents) corresponding to several execution components 810 and the orchestrator component 230 may send a portion of the NLU data to each of the several execution components 810 without departing from the disclosure.

As described above with regard to FIG. 3, to improve the system response generated by the remote system 120, the remote system 120 may personalize the response by ingesting data and performing prediction and inference processing. For example, the remote system 120 may include an ingestion component 320 that accesses personal data stored in multiple different locations (e.g., data sources 310) (step "A") and sends the personal data to the NLU component 260 (step "B"). The NLU component 260 may perform NLU processing to the personal data to generate ingested NLU data and may send the ingested NLU data to the first data storage component 275 (step "C"). Thus, the remote system 120 may generate ingested NLU data from multiple different personal data repositories and may store the ingested NLU data in a single location that is accessible during speech processing (e.g., first data storage component 275).

While FIG. 8 illustrates the ingestion component 320 accessing personal data and sending the personal data to the NLU component 260 for NLU processing, the disclosure is not limited thereto. In some examples, the ingestion component 320 may access personal data and send the personal data directly to the first data storage component 275 without departing from the disclosure. Thus, the ingestion component 320 may ingest personal data without performing NLU processing without departing from the disclosure. For ease of illustration, the ingested NLU data stored in the first data storage component 275 may include personal data that was sent directly from the ingestion component 320 to the first data storage component 275. As will be described in greater detail below with regard to FIGS. 10A-10B, the ingestion component 320 may be configured to ingest both structured data and unstructured data without departing from the disclosure.

Additionally or alternatively, the remote system 120 may process the ingested NLU data using a prediction and inference component 330 that may draw correlations and inferences from the ingested NLU data and/or generate predictions. For example, FIG. 8 illustrates that the first data storage component 275 may send the ingested NLU data to the prediction and inference component 330 (step "D"), the prediction and inference component may process the ingested NLU data to generate inference data and may send the inference data back to the first data storage component 275 (step "E"). Thus, in addition to the ingested NLU data, the first data storage component 275 may include additional information generated from the ingested NLU data to further improve the system response.

Figure 9A:
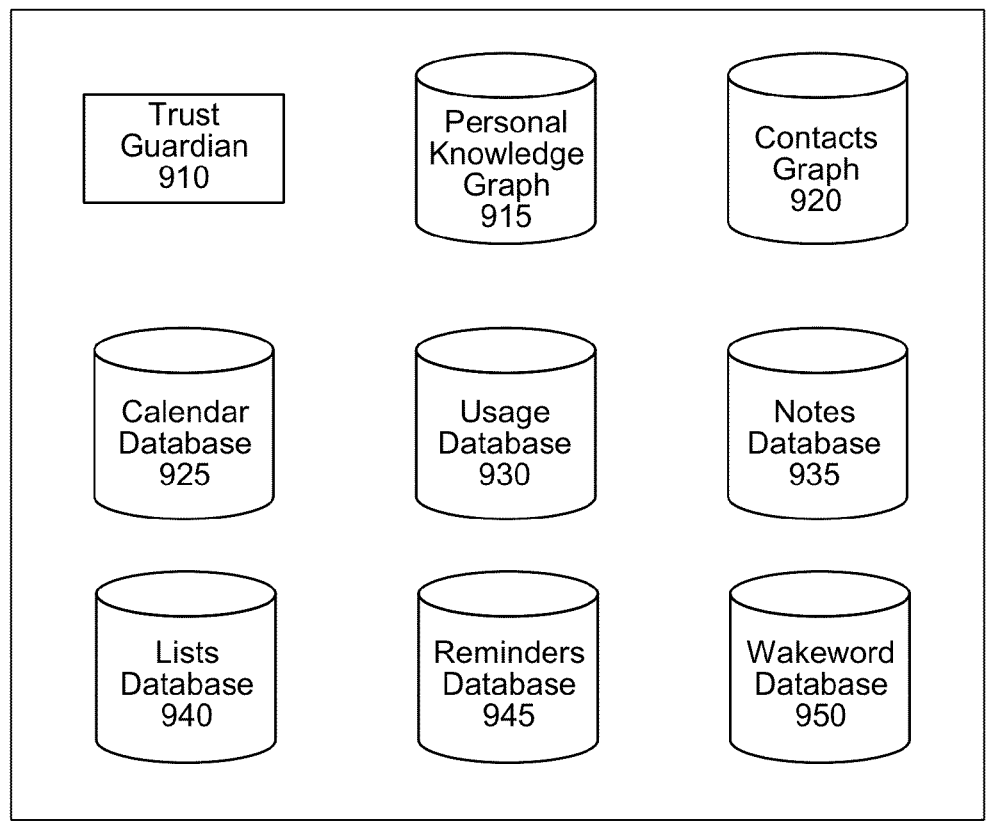
FIGS. 9A-9B illustrate examples of first data storage and permissions used to control access to personal data.
Figure 9B:
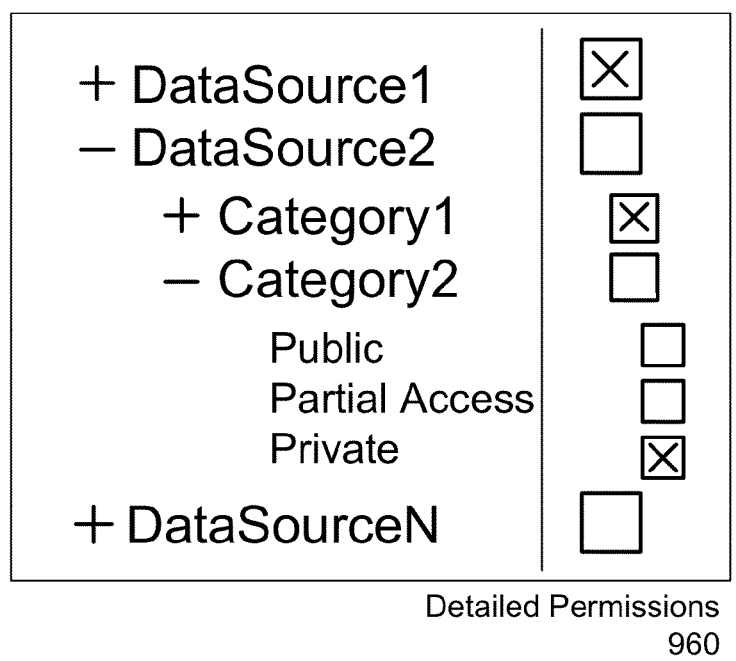

FIGS. 9A-9B illustrate examples of first data storage and permissions used to control access to personal data. As illustrated in FIG. 9A, the first data storage component 275 may store personal data associated with a variety of different data sources 310. For example, the first data storage component 275 may include a trust guardian component 910, a personal knowledge graph 915, a contacts graph 920, a calendar database 925, a usage database 930, a notes database 935, a lists database 940, a reminders database 945, a wakeword database 950, and/or the like without departing from the disclosure. While FIG. 9A illustrates examples of databases that may be associated with the first data storage component 275, the disclosure is not limited thereto and the first data storage component 275 may also include additional databases not shown, such as an utterance history database, an interaction history database, and/or the like, without departing from the disclosure.

While FIG. 9A illustrates these graphs/databases being included within the first data storage component 275, the disclosure is not limited thereto and the personal data may be distributed between multiple different components without departing from the disclosure. For example, some of the graphs/databases may be stored in one or more locations within the remote system 120 while others may be stored external to the remote system 120 without departing from the disclosure. To illustrate an example, a database associated with the first data storage component 275 may be located external to the remote system 120 as part of a skill system 125 without departing from the disclosure.

Additionally or alternatively, the graphs/databases illustrated as being part of the first data storage component 275 may correspond to the actual (e.g., original) data sources 310 or may correspond to a local graph/database associated with the data sources 310 without departing from the disclosure. For example, the calendar database 925 may correspond to a first database configured to store calendar data associated with the user profile (e.g., calendar skill, calendar domain, etc.), or the calendar database 925 may correspond to a second database that is configured to store personal data associated with the calendar data. In the second example, the first database may store the calendar data and the second database may store the personal data (e.g., correlated information, inferences and predictions, and/or the like) generated during the ingestion process (e.g., received from the NLU component 260 in step "C" or from the prediction and inference component 330 in step "E").

In some examples, the first data storage component 275 may duplicate personal data stored in the data sources 310, such that the remote system 120 stores first personal data in the data sources 310 and stores second personal data that includes at least portions of the first personal data in the first data storage component 275. However, the disclosure is not limited thereto and in other examples the first data storage component 275 may store a reference (e.g., association, address, etc.) to the first personal data stored in the data sources 310 without departing from the disclosure. For example, the data sources 310 may store the first personal data and the first data storage component 275 may store a reference to the first personal data along with second personal data that is generated during the ingestion process (e.g., received from the NLU component 260 in step "C" or from the prediction and inference component 330 in step "E"), such as correlated information, inferences and predictions, and/or the like.

While the trust guardian component 910 is illustrated as part of the first data storage component 275, the disclosure is not limited thereto and the trust guardian component 910 may be included within and/or separate from the data storage component 275 without departing from the disclosure.

The trust guardian component 910 may be configured to control access to personal data by enabling and disabling permissions associated with specific skills, sources of personal data, categories of personal data, and/or the like. As illustrated in FIG. 9B, detailed permissions 960 illustrates an example in which access to personal data is controlled based on an individual data source (e.g., DataSource1, DataSource2, ..., DataSourceN) and category of personal data (e.g., Category1, Category2, etc.). For example, the remote system 120 may control access based on the individual personal data repositories (e.g., the graphs/databases illustrated in FIG. 9A), such that first personal data associated with a first data source is public (e.g., accessible to all skills) while second personal data associated with a second data source is kept private. Similarly, within a single data source, a first portion of the second personal data may correspond to a first category of information (e.g., Category 1) and be made public while a second portion of the second personal data may correspond to a second category of information (e.g., Category2) and be kept private without departing from the disclosure. For example, the first category may be considered general information (e.g., user preferences, such as preferred type of restaurant) whereas the second category may be considered private information (e.g., purchase history, financial information, etc.).

While not illustrated in FIG. 9B, the trust guardian component 910 may also control access to personal data for individual skills. For example, a first skill may have access to the private information whereas a second skill may only have access to public information. Thus, the trust guardian component 910 may enable the remote system 120 to grant the user profile full control over the personal data that is used to generate suggestions and recommendations, proactively send an unsolicited system response, and/or the like.

In addition to controlling access to the personal data, the trust guardian component 910 may also be configured to perform additional functionality. In some examples, the trust guardian component 910 may be configured to track a source of the personal data, enabling the remote system 120 to indicate to the user how the personal data was acquired or determined. To illustrate an example, the remote system 120 may ingest calendar data and determine that a vacation is being planned. In addition to generating suggestions related to planning and booking the vacation, the remote system 120 may store an indicator that the vacation event was inferred based on the calendar data. Thus, if the user requests information about how the remote system 120 became aware of the vacation event, the remote system 120 may generate a system response indicating the individual calendar event that led to the vacation inference.

In some examples, in addition to tracking the source of the personal data, the trust guardian component 910 may be configured to enable the user to control a level of privacy (e.g., privacy level) associated with the personal data. For example, after receiving the system response indicating the individual calendar event that led to the vacation inference, the user may input a command to restrict access to the personal data. The remote system 120 may process the command and restrict access to the personal data, such as by preventing the first data storage component 275 from sharing this information with other components and/or using the personal data in future interactions. Thus, the remote system 120 may increase the level of privacy associated with the vacation event, enabling the user to keep the vacation event private or avoid inferences associated with the vacation event from being used in other interactions.

In some examples, the trust guardian component 910 may be configured to enable the user to delete the personal data and/or the source of the personal data without departing from the disclosure. For example, after receiving the system response indicating the individual calendar event that led to the vacation inference, the user may input a command to delete the vacation inference (e.g., personal data associated with the vacation inference). The remote system 120 may process the command to identify personal data associated with the vacation inference and delete the selected personal data from the first data storage component 275. Additionally or alternatively, after receiving the system response indicating the individual calendar event that led to the vacation inference, the user may input a command to delete the vacation inference and the source of the personal data (e.g., calendar data corresponding to the individual calendar event). The remote system 120 may process the command to identify personal data associated with the vacation inference and delete the selected personal data from the first data storage component 275. In addition, the remote system 120 may delete the calendar data corresponding to the individual calendar event from the first data storage 275 and/or the data sources 310.

In some examples, the wakeword database 950 may associate personal data with a particular wakeword or voice interface (e.g., assistant) with which the user interacted with the remote system 120. For example, the remote system 120 may distinguish first personal data that is associated with a first wakeword from second personal data that is associated with a second wakeword. In one example a first wakeword may be associated with a first speech processing system (for example with its own speech processing 240, skill(s) 290 and/or other components) while a second wakeword may be associated with a second speech processing system (for example with its own speech processing 240, skill(s) 290 and/or other components). The components of the first speech processing system may have some overlap with the second speech processing system or the components of the two speech processing systems may be completely different. For example, if a user speaks the first wakeword his/her request may be handled by the first speech processing system whereas if a user speaks the second wakeword his/her request may be handled by the second speech processing system. As an individual wakeword may also correspond to a single device or type of devices (e.g., vehicle), the remote system 120 may be configured to store the first personal data but not the second personal data or vice versa. Additionally or alternatively, the remote system 120 may be configured to control first permissions associated with the first personal data differently than second permissions associated with the second personal data, as described in greater detail above with regard to FIG. 9B. The system may thus, with appropriate user permission, use the wakeword spoken by a user during a particular interaction to build the knowledge base about the user. In another example the user may indicate to the system that commands spoken with a first wakeword may be used to build the knowledge base but commands spoken with a second wakeword may not. The system may thus not perform knowledge ingestion for information for commands spoken with the second wakeword. Many such configurations are possible depending on user preferences.

Figure 10A:
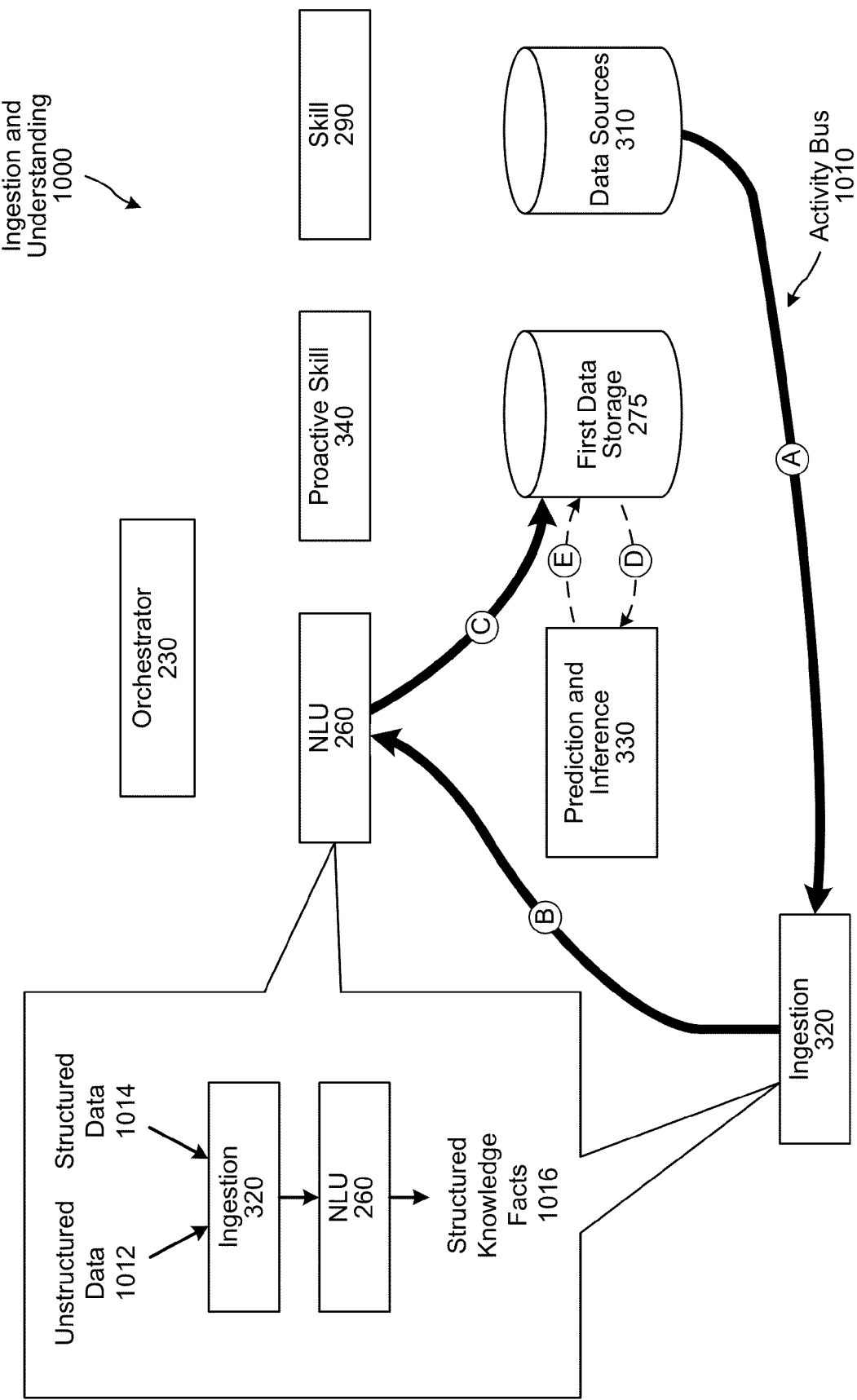
FIGS. 10A-10B illustrate examples of performing ingestion and understanding processing.
Figure 10B:
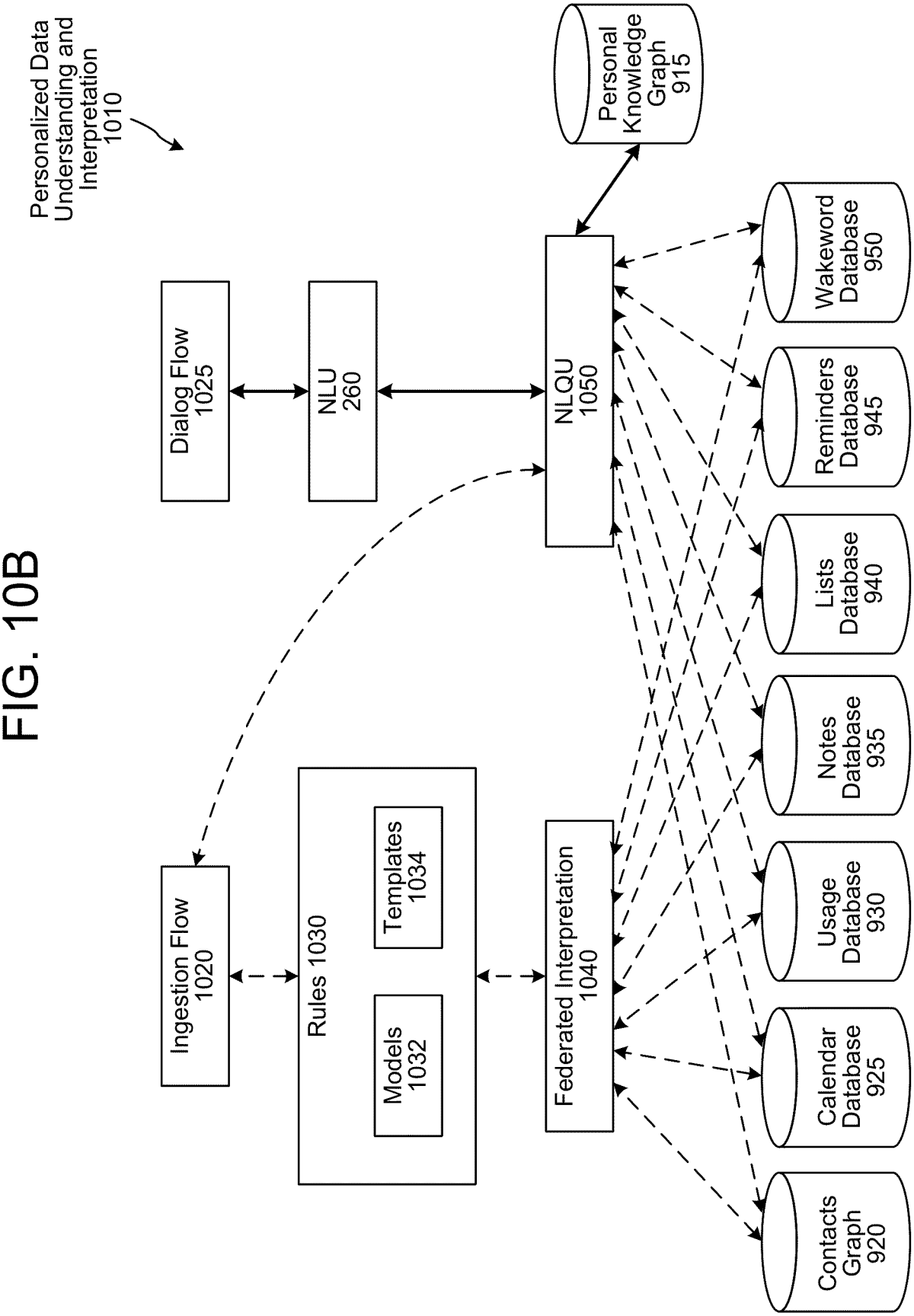

FIGS. 10A-10B illustrate examples of performing ingestion and understanding processing. As illustrated in FIG. 10A, the remote system 120 may be configured to ingest activity data from the data sources 310 via an activity bus 1010. For example, the remote system 120 may generate activity data for each action performed and send the activity data to the activity bus. The activity data may include information associated with the action performed, such as the action, an indication of the skill component and/or skill system 125 associated with the action, first information corresponding to the action, and/or the like, although the disclosure is not limited thereto.

The activity bus may be a component configured to distribute data regarding system activity associated with the user profile. For example, the activity bus may distribute activity data corresponding to sensor data generated by a sensor of a device 110 (e.g., thermometer data, motion sensor data, proximity data, etc.), processed sensor data generated from the sensor data (e.g., presence data, identity data, etc.), an indication of an action performed by the system 100 (e.g., indicating that a first user profile performed a first action using a first skill at a first time), and/or the like, although the disclosure is not limited thereto. Thus, the system 100 may generate activity data for any action performed by the system 100 and/or based on sensor data.

In some examples, the remote system 120 may process the activity data associated with the activity bus 1010. As shown by ingestion and understanding processing 1000 illustrated in FIG. 10A, the remote system 120 may process activity data from the activity bus 1010 to determine first information (e.g., personal data) represented in the activity data and may store the first information in association with the user profile (e.g., store an association between the first information and a user profile).

As described in greater detail above, the remote system 120 may ingest both textual data and non-textual data, such as image data (e.g., pictures, videos, etc.), audio data, and/or the like. For example, the activity data may include a combination of textual data and non-textual data, such as image data associated with a description of the image data, and the remote system 120 may ingest both the textual data and the non-textual data to generate the personal data stored in the first data storage component 275.

As illustrated in FIG. 10A, the ingestion component 320 may send a first portion of the activity data (e.g., textual data included in the activity data) to the NLU component 260 to perform natural language processing on the textual data. Thus, the NLU component 260 may perform natural language processing to generate first personal data and may send the first personal data to the first data storage component 275. While not illustrated in FIG. 10A, in some examples the remote system 120 may perform computer processing on a second portion of the activity data (e.g., image data included in the activity data) to perform object detection, facial recognition, and/or additional processing. Based on the computer processing, the remote system 120 may generate second personal data describing content represented in the image data. Additionally or alternatively, the remote system 120 may perform audio processing on a third portion of the activity data (e.g., audio data included in the activity data) to perform voice recognition, speech processing, natural language processing, and/or the like. Thus, while not illustrated in FIG. 10A, the remote system 120 may send the third portion of the activity data to the ASR component 250, although the disclosure is not limited thereto.

In addition to being configured to ingest textual data and non-textual data, the ingestion component 320 may be configured to ingest structured data and/or unstructured data without departing from the disclosure. As illustrated in FIG. 10A, the ingestion component 320 may receive unstructured data 1012 and/or structured data 1014 and the NLU component 260 may output structured knowledge facts 1016. As used herein, data corresponds to structured data 1014 if it has an associated schema (e.g., separate fields with corresponding content, such as header fields in an email message, calendar date and time fields, etc.), and corresponds to unstructured data 1012 if does not (e.g., sentence in a body of the email message).

In some examples, the ingestion component 320 may be configured to convert the unstructured data 1012 to a structured format and then send the converted unstructured data 1012 (e.g., in the structured format) and/or the structured data 1014 to the NLU component 260 for natural language processing. For example, the ingestion component 320 may be configured to extract portions of the unstructured data 1012 to generate multiple fields of data and then pass the multiple fields to the NLU component 260. However, the disclosure is not limited thereto, and in other examples the NLU component 260 may be configured to perform natural language processing on the unstructured data 1012 without departing from the disclosure. For example, the ingestion component 320 may send the unstructured data 1012 and/ or the structured data 1014 to the NLU component 260 and the NLU component 260 may process the unstructured data 1012 and/or the structured data 1014 to generate the structured knowledge facts 1016 without departing from the disclosure.

While FIG. 10A illustrates the NLU component 260 performing natural language processing to generate the personal data, the disclosure is not limited thereto and the remote system 120 may be configured to generate the personal data using additional components not illustrated in FIG. 10A.

FIG. 10B illustrates an example of additional components that may be used to perform personalized data understanding and interpretation 1010. As illustrated in FIG. 10B, personalized data understanding and interpretation processing 1010 may be split into two steps, ingestion flow 1020 and dialog flow 1025. For example, dialog flow 1025 corresponds to the processing and/or components associated with generating a system response that is responsive to a user query, whereas ingestion flow 1020 corresponds to the processing and/or components associated with ingesting personal data (e.g., personalized data).

As illustrated in FIG. 10B, the dialog flow processing 1025 may include the NLU component 260, a natural language query understanding (NLQU) component 1050, and the personal knowledge graph 915. For example, a user utterance may be received and processed by the remote system 120, as described in greater detail above. When the remote system 120 sends the ASR data to the NLU component 260, the NLU component 260 may communicate with the NLQU component 1050 and/or the personal knowledge graph 915 to generate the system response.

As illustrated in FIG. 10B, the ingestion flow processing 1020 may include a rules component 1030, which may include models 1032 and templates 1034, a federated interpretation component 1040, the NLQU component 1050, and the data repositories associated with the first data storage component 275. For example, FIG. 10B illustrates the contacts graph 920, the calendar database 925, the usage database 930, the notes database 935, the lists database 940, the reminders database 945, and the wakeword database 950, although the disclosure is not limited thereto. As illustrated in FIG. 10B, each of these databases may communicate with the federated interpretation component 1040 and/or the NLQU component 1050 during the ingestion flow processing 1020, although the disclosure is not limited thereto.

Using the components illustrated in FIG. 10B, the remote system 120 may use rules based interpretation during ingestion in order to extract knowledge from unstructured and structured data and transform the knowledge into structured knowledge facts 1016 (e.g., personal data) that can be stored in the first data component 275. When there are multiple sources of understanding or interpretation (e.g., data can be included within the body of an email message and also received as standalone data), the federated interpretation component 1040 may de-duplicate, resolve conflicts, and rank and select the best alternative (or set of alternatives). The ranking and selection will dynamically adjust over time via an automated algorithm as more data, improved models, and user feedback become available. For example, when the user validates the facts (e.g., personal data) that is extracted during ingestion, the remote system 120 may store additional metadata representing that the data has been validated so that the remote system 120 may differentiate validated facts from unvalidated extracted facts, although the disclosure is not limited thereto.

While the dialog flow processing 1025 (e.g., NLU component 260 and/or NLQU component 1050) may be configured to process user queries during run-time (e.g., online), the ingestion flow processing 1020 may be configured to process data ingested from personal data sources (e.g., offline). In some examples, the remote system 120 may be configured to understand and/or interpret unstructured data by leveraging structured data (e.g., email headers, calendar date and time fields, etc.) to extract metadata and build syntactic and semantic search indexes. Thus, the remote system 120 may be configured to use the NLQU component 1050 during the ingestion flow processing 1020 to understand and interpret the unstructured data and extract facts from unstructured knowledge.

In some examples, the remote system 120 may be configured to store and execute rules when ingesting structured data. For example, the rules component 1030 may use models 1032 (e.g., statistical analysis) and/or templates 1034 to interpret relevant personal data. To illustrate some examples, the remote system 120 may identify tracking identifiers or restaurant reservations included in email messages and may take an appropriate action, such as storing a package status (e.g., in a package tracking database) or creating a calendar event (e.g., in the calendar database 925).

The rules component 1030 may also interpret relevant usage patterns (e.g., using data from the usage database 930) and store these usage patterns in the first data component 275 for subsequent prediction and inference. For example, the remote system 120 may determine that the user creates a reminder after listening to an email message and store this usage pattern so that the remote system 120 may suggest creating a reminder after outputting a future email message to the user. The rules component 1030 may store general templates and models (e.g., order confirmation email templates for extracting package tracking identifiers associated with a particular shipping provider or merchant) and/or personalized templates and models (e.g., personalized to the user profile, such as a template/model to interpret data received in an email message from a particular email address) without departing from the disclosure.

FIG. 11 illustrates an example of ingesting data from an activity bus during a remote data event 1100. As illustrated in FIG. 11, the remote system 120 may receive an utterance (e.g., user query) (step "1") and may process the utterance using multiple components to generate a system response (step "10"). For example, the device 110 may send input audio data representing the utterance to the remote system 120 (step "1") and the orchestrator component 230 of the remote system 120 may send the input audio data to the ASR component 250 (step "2"). The ASR component 250 may process the input audio data (e.g., perform automatic speech recognition processing) to generate ASR data and may send the ASR data back to the orchestrator component 230 (step "3").

The orchestrator may then send the ASR data to the NLU component 260 (step "4"). The NLU component 260 may process the ASR data (e.g., perform natural language understanding processing) to generate NLU data (e.g., N-best list of possible interpretations) and may send the NLU data back to the orchestrator component 230 (step "5"). The orchestrator component 230 may send the NLU data to the skill component 290 (step "6") and the skill component 290 may perform an action indicated by the NLU data.

As illustrated in FIG. 11, performing the action may include the skill component 290 sending a remote data request 1110 (e.g., request for additional information) to one of the data sources 310 (step "7") and receiving remote data facts 1115 (e.g., the additional information requested) from the data sources 310 (step "8"). For example, to perform the action responsive to the user query, the skill component 290 may send a request for information to a particular database associated with the action and may receive the requested information (e.g., remote data) from the particular database. Examples of the data sources 310 may include a contacts graph, a calendar database, a usage database, a notes database, a lists database, a reminders database, a wakeword database, the skill system(s) 125, a skill database associated with the skill system(s) 125, and/or the like, although the disclosure is not limited thereto.

To illustrate an example, the user query may correspond to a request for information about a particular airline flight (e.g., "Flight 123"). The remote system 120 may determine that the user query corresponds to a first action (e.g., determine a status of and/or flight information associated with "Flight 123") and may send a command to the skill component 290 to perform the first action. In order to perform the first action, the skill component 290 may send a request for first flight information associated with "Flight 123" to an external database that stores flight information for a plurality of flights. The external database may generate the first flight information and send it back to the skill component 290, which may generate first output data responsive to the user query that includes the first flight information.

While not illustrated in FIG. 11, in some examples the skill component 290 may retrieve personal data from the first data storage component 275 and may use the personal data to request the remote data from the data sources 310. For example, the personal data may include information about the user profile, authorization data, permission data, and/or the like that authorizes the skill component 290 to receive the remote data. For example, the data sources 310 may require identifying information, authentication, and/or the like prior to providing the remote data. Additionally or alternatively, the personal data may include semantic information or contextual information that assists the skill component 290 in determining the remote data to request. Using the example described above, the user query may not indicate an airline associated with "Flight 123" and the execution component 810 may use the personal data to identify the airline before requesting the flight information, although the disclosure is not limited thereto.

To generate the system response, the skill component 290 may generate first output data based on the remote data facts 1115 and then send the first output data to the orchestrator component 230 (step "9"). After receiving the first output data from the skill component 290, the orchestrator component 230 may send the first output data as the system response to the device 110 (step "10"). However, the disclosure is not limited thereto, and in other examples the remote system 120 may perform additional processing not illustrated in FIG. 11 without departing from the disclosure. For example, the orchestrator component 230 may send the first output data to another component (e.g., TTS component 280) to generate second output data (e.g., output audio data representing synthesized speech) and may send the second output data as the system response to the device 110 without departing from the disclosure.

Unlike the personal data received from the first data component 275 in the previous drawings, the remote data facts 1115 may include information that is not known to the remote system 120 and/or stored in the first data storage component 275. Thus, the remote system 120 may improve future processing by ingesting the remote data facts 1115.

In some examples, the remote system 120 may generate activity data associated with the first output data and may add the activity data to an activity bus 1010. As described in greater detail above, the activity bus 1010 may be a component configured to distribute data associated with system activity. For example, the activity bus 1010 may receive activity data from one or more skill components 290 and/or skill system(s) 125 and may include activity data corresponding to multiple actions performed by the remote system 120.

The activity data may indicate a particular action performed and may include additional information associated with the action, such as a portion of the remote data facts 1115. Thus, the remote system 120 may improve future processing by ingesting the activity data associated with the activity bus 1010. For example, the remote system 120 may include an ingestion component 320 that accesses the activity data from the activity bus 1010 (step "11"). As the activity data may be associated with multiple different actions, databases, skill components 290, skill system(s) 125, and/or the like, FIG. 11 illustrates the activity data being sent from the data sources 310 to the ingestion component 320, although the disclosure is not limited thereto.

In the example illustrated in FIG. 11, the activity data accessed in step "11" corresponds to the first output data generated by the skill component 290 that was sent to the orchestrator component 230 in step "9" of FIG. 11. Thus, the ingestion component 320 may ingest the activity data associated with the remote data facts 1115 and may send the activity data to the NLU component 260 (step "12"). The NLU component 260 may perform NLU processing to the activity data to generate ingested NLU data and may send the ingested NLU data to the first data storage component 275 (step "13"). Thus, the remote system 120 may generate ingested NLU data associated with the remote data facts 1115 and may store the ingested NLU data in a single location that is accessible during speech processing (e.g., first data storage component 275).

While FIG. 11 illustrates the ingestion component 320 accessing activity data and sending the activity data to the NLU component 260 for NLU processing, the disclosure is not limited thereto. In some examples, the ingestion component 320 may access activity data and send the activity data directly to the first data storage component 275 without departing from the disclosure. Thus, the ingestion component 320 may ingest activity data without performing NLU processing without departing from the disclosure. For ease of illustration, the ingested NLU data stored in the first data storage component 275 may include activity data that was sent directly from the ingestion component 320 to the first data storage component 275.

Additionally or alternatively, the remote system 120 may process the ingested NLU data using a prediction and inference component 330 that may draw correlations and inferences from the ingested NLU data and/or generate predictions. For example, FIG. 11 illustrates that the first data storage component 275 may send the ingested NLU data to the prediction and inference component 330 (step "14"), the prediction and inference component may process the ingested NLU data to generate inference data and may send the inference data back to the first data storage component 275 (step "15"). Thus, in addition to the ingested NLU data, the first data storage component 275 may include additional information generated from the ingested NLU data to further improve the system response.

In the example illustrated in FIG. 11, the remote system 120 may perform first NLU processing to generate the system response (e.g., steps "1"-"10") and then may perform second NLU processing to generate the ingested NLU data and/or inference data corresponding to the system response (e.g., steps "11"-"15"). Thus, the remote system 120 may ingest remote data facts 1115 associated with a first skill component, first skill system, first domain, and/or the like to generate the ingested NLU data and/or inference data and then may use the ingested NLU data and/or inference data to improve a system response associated with a second skill component, second skill system, second domain, and/or the like. While not illustrated in FIG. 11, the ingested NLU data and/or inference data may be stored to the personal knowledge graph 915 to improve future processing.

While FIG. 11 illustrates the remote system 120 monitoring the activity bus 1010 to ingest the activity data associated with the remote data facts 1115, the disclosure is not limited thereto and the remote system 120 may ingest activity data, personal data, and/or other data from the data sources 310 using any techniques known to one of skill in the art without departing from the disclosure. Additionally or alternatively, in some examples the ingestion component 320 may filter the activity data associated with the activity bus 1010 to ingest only a portion of the overall activity data. For example, the ingestion component 320 may identify activity data that is interesting, that is relevant to the user profile and/or recent actions associated with the user profile, that satisfies a condition (e.g., includes a particular keyword and/or the like), and/or the like without departing from the disclosure.

While interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Piano Man by Billy Joel" the user may ask the system "when did he write that?" In order to answer the second query, the system must understand that "he" refers to Billy Joel and "that" refers to the song Piano Man. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora / (e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages. For example, the remote system 120 may use the personal knowledge graph 915 to resolve multiple forms of anaphora without departing from the disclosure.

Figure 12:
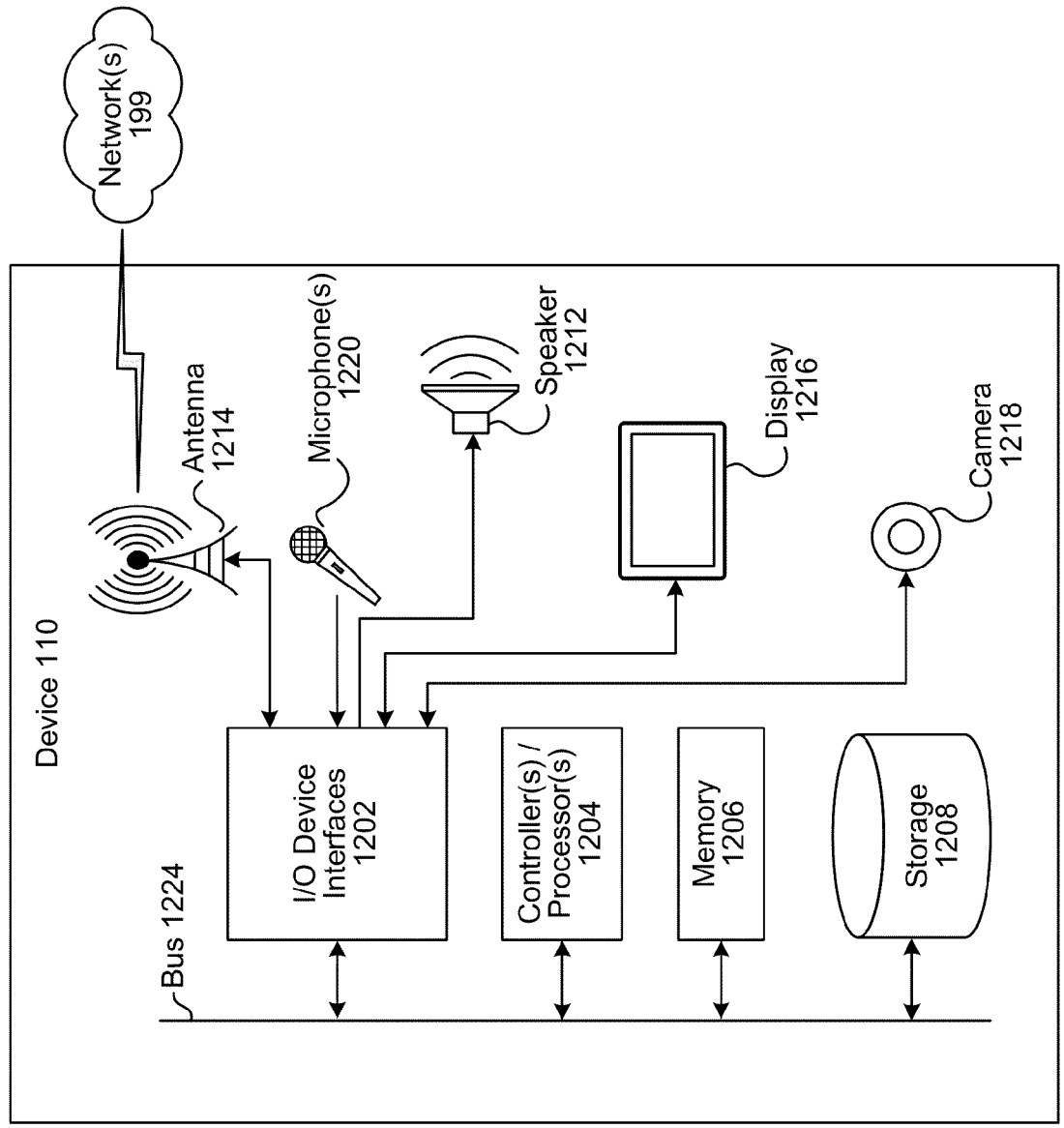
FIG. 12 is a block diagram conceptually illustrating example components of a device.
Figure 13:
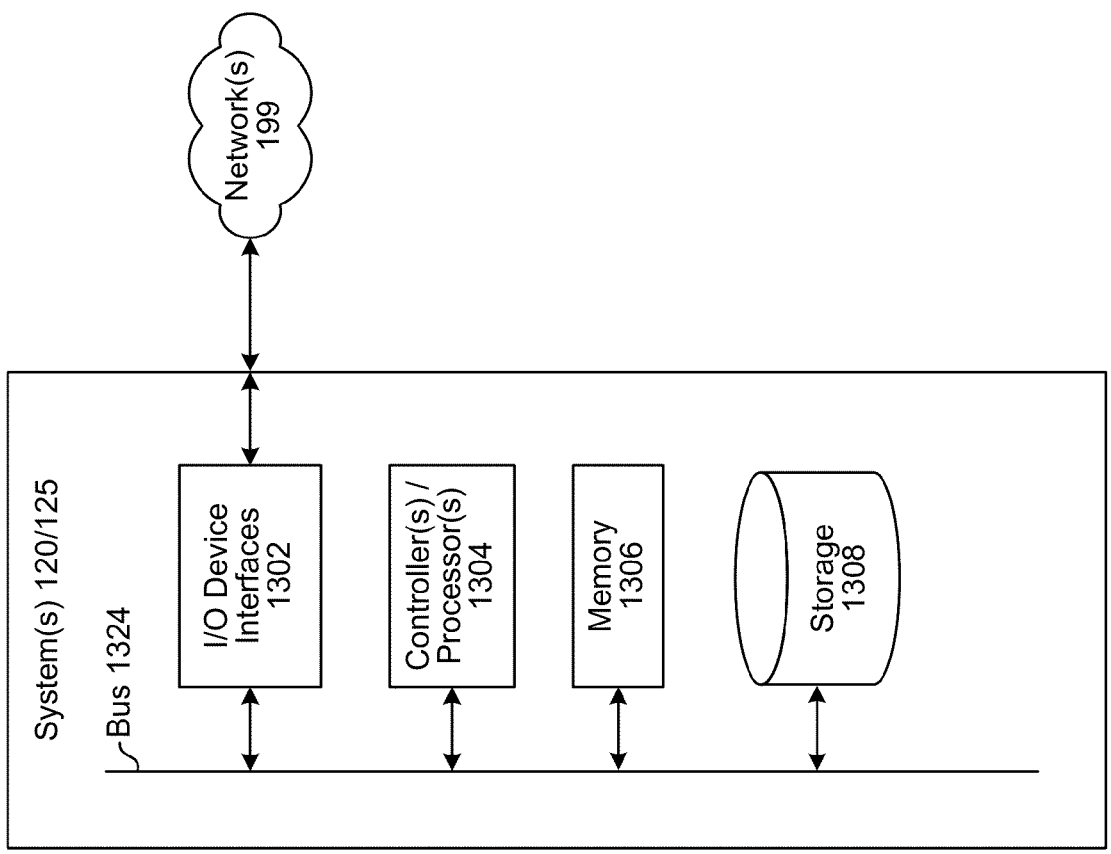
FIG. 13 is a block diagram conceptually illustrating example components of a system.

FIG. 12 is a block diagram conceptually illustrating a device 110 that may be used with the system. FIG. 13 is a block diagram conceptually illustrating example components of a remote device, such as the natural language processing remote system 120, which may assist with ASR processing, NLU processing, etc., and skill system(s) 125. A system (120/125) may include one or more servers. A "server" as used herein may refer to a traditional server as understood in a server / client computing structure but may also refer to a number of different computing components that may assist with the operations discussed herein. For example, a server may include one or more physical computing components (such as a rack server) that are connected to other devices / components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110, the natural language processing remote system 120, and/or skill system(s) 125 may include their own dedicated processors, memory, and/or storage. Alternatively, one or more of the components of the device 110, the natural language processing remote system 120, and/or skill system(s) 125 may utilize the I/O interfaces (1202/1302), processor(s) (1204/1304), memory (1206/1306), and/or storage (1208/1308) of the device(s) 110, natural language processing remote system 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing remote system 120, and skill system(s) 125, as described herein, are illustrative, and may be located as a stand-alone device or may be included, in whole or in part, as a component of a larger device or system.

Figure 14:
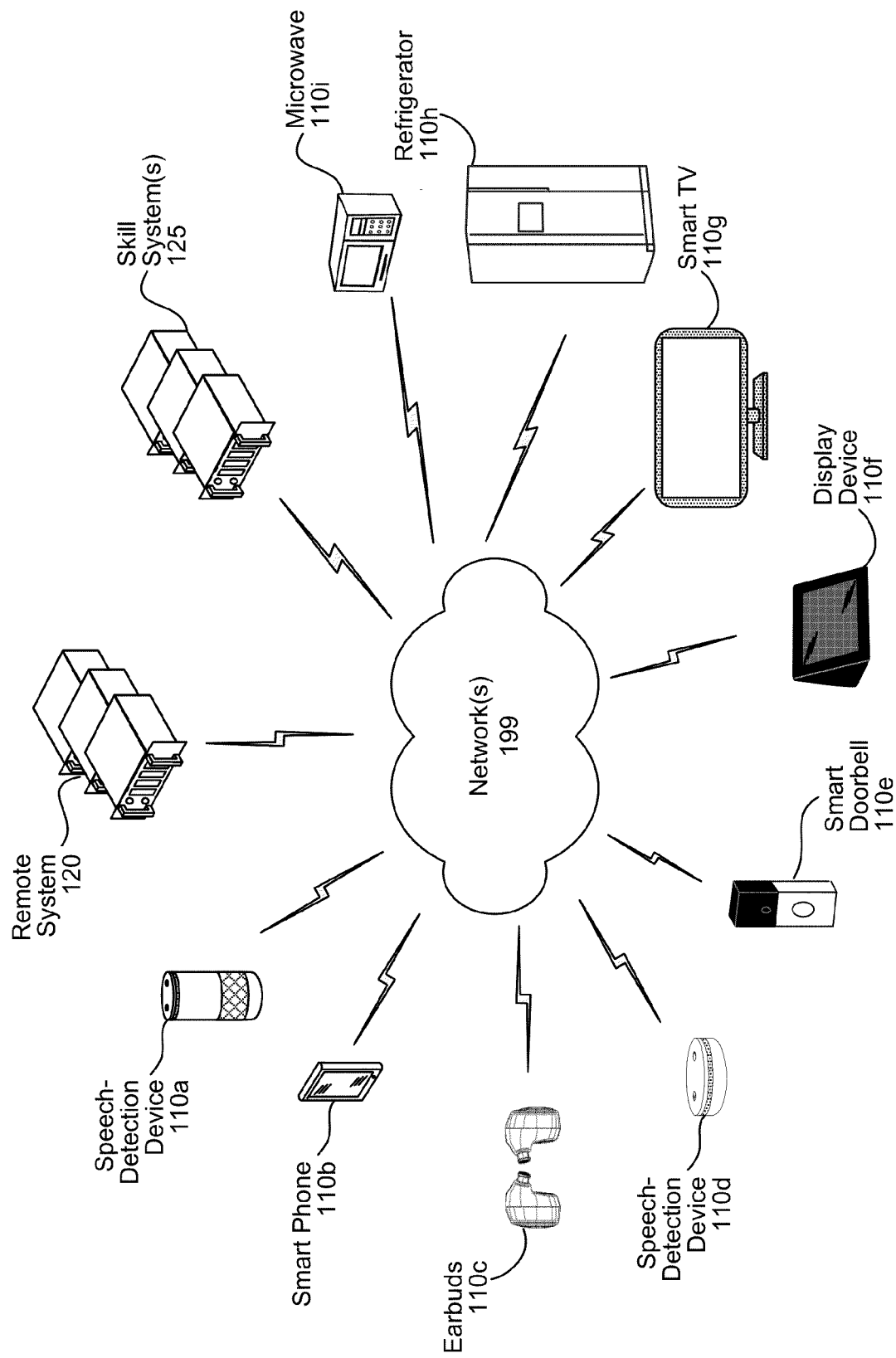
FIG. 14 illustrates an example of a computer network for use with the overall system.

As illustrated in FIG. 14, multiple devices (110a-110i, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, personal earbuds 110c, a speech-detection device 110d, a smart doorbell 110e, a display device 110f, a smart television 110g, a refrigerator 110h, and/or a microwave 110i may be connected to the network(s) 199 through a wireless service provider, over a WiFi or cellular network connection, or the like. Other devices are included as network-connected support devices, such as the natural language processing remote system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving first audio data representing a first utterance;
    determining that the first utterance corresponds to a first request to perform a first action;
    causing the first action to be performed by a first skill system;
    generating first activity data indicating the first action, the first activity data associated with a user profile and including first information;
    sending the first activity data to a component configured to distribute data regarding system activity;
    processing the first activity data to determine a first entity represented in the first information and a first attribute associated with the first entity;
    storing the first entity in a knowledge graph associated with the user profile;
    storing the first attribute in the knowledge graph;
    receiving second audio data representing a second utterance;
    determining, using the knowledge graph, that the second utterance corresponds to a second request to perform a second action with regard to the first entity; and
    causing the second action to be performed by a second skill system.

2. The computer-implemented method of claim 1, further comprising:
    determining that the first entity is associated with an upcoming event represented in calendar data associated with the user profile;
    determining, using the knowledge graph, a third action to perform with respect to the upcoming event and the user profile;
    generating third audio data including synthesized speech requesting permission to perform the third action;
    determining a first device associated with the user profile;
    sending, to the first device, the third audio data;
    receiving, from the first device, fourth audio data representing a third utterance;
    determining that the third utterance grants authorization to perform the third action; and
    causing the third action to be performed.

3. The computer-implemented method of claim 1, further comprising:
    performing natural language processing to determine that the first entity corresponds to first contact information;
    determining that the first attribute indicates a date associated with the first entity;
    determining that a second attribute indicates a personal relationship between the user profile and the first entity; and
    generating second contact information using the first contact information, the first attribute, and the second attribute, the second contact information indicating the personal relationship and the date.

4. The computer-implemented method of claim 1, further comprising:
    determining that the first utterance includes a representation of a first wakeword;
    determining that the representation satisfies a condition;
    storing the first entity in the knowledge graph in association with the first wakeword; and
    storing the first attribute in the knowledge graph in association with the first wakeword.

5. A computer-implemented method, the method comprising:
    receiving first input data representing a first natural language input;
    determining that the first input data corresponds to a first request to perform a first action;
    causing the first action to be performed;
    generating first activity data corresponding to the first action;
    sending the first activity data to a first component configured to distribute data regarding system activity;
    receiving, from the first component, second activity data representing the system activity for a duration of time, the second activity data including the first activity data;
    sending the second activity data to a second component including a computer processor configured to perform natural language processing;
    processing, by the second component, using natural language processing, data representing the second activity data to determine first information;
    storing the first information in association with a first user profile;
    receiving second input data representing a second natural language input;
    determining, using the first information, that the second input data corresponds to a second request to perform a second action; and
    causing the second action to be performed.

6. The computer-implemented method of claim 5, further comprising:
    detecting an upcoming event associated with the first user profile;
    determining that the first information corresponds to the upcoming event;
    determining, using the first information and the upcoming event, a third action to potentially perform;
    sending, to a first device associated with the first user profile, first output data requesting permission to perform the third action;
    receiving, from the first device, third input data;
    determining that the third input data grants the permission; and
    causing the third action to be performed.

7. The computer-implemented method of claim 6, wherein sending the first output data further comprises:
    determining that the second action is only visible to the first user profile;
    determining that the first user profile is associated with at least the first device and a second device;
    determining that the second device is also associated with a second user profile;
    determining that the first device is only associated with the first user profile; and
    sending the first output data to the first device.

8. The computer-implemented method of claim 5, further comprising:
performing natural language processing to the first information to determine at least a first entity represented in the first information and at least one attribute associated with the first entity;
storing the first entity in a knowledge graph associated with the first user profile; and
storing the at least one attribute in the knowledge graph.

9. The computer-implemented method of claim 5, further comprising:
determining that the first information corresponds to a reoccurring event;
generating calendar data representing the reoccurring event; and
storing the calendar data in association with the first user profile.

10. The computer-implemented method of claim 5, further comprising:
determining that a first portion of the first input data corresponds to the first natural language input;
determining that a second portion of the first input data corresponds to media content; and
processing the second portion of the first input data to generate the first information.

11. The computer-implemented method of claim 5, further comprising:
determining that the first input data includes a representation of a first wakeword;
determining that the representation satisfies a condition; and
storing the first information in association with the first user profile and the first wakeword.

12. A system comprising:
at least one processor; and
memory including instructions operable to be executed by the at least one processor to cause the system to:
receive first input data representing a first natural language input;
determine that the first input data corresponds to a first request to perform a first action;
cause the first action to be performed;
generate first activity data corresponding to the first action;
send the first activity data to a first component configured to distribute data regarding system activity;
receive, from the first component, second activity data representing the system activity for a duration of time, the second activity data including the first activity data;
send the second activity data to a second component configured to perform natural language processing;
process, by the second component, using natural language processing, data representing the second activity data to determine first information;
store the first information in association with a first user profile;
receive second input data representing a second natural language input;
determine, using the first information, that the second input data corresponds to a second request to perform a second action; and
cause the second action to be performed.

13. The system of claim 12, wherein the memory further comprises instructions that, when executed by the at least one processor, further cause the system to:
detect an upcoming event associated with the first user profile;
determine that the first information corresponds to the upcoming event;
determine, using the first information and the upcoming event, a third action to potentially perform;
send, to a first device associated with the first user profile, first output data requesting permission to perform the third action;
receive, from the first device, third input data;
determine that the third input data grants the permission; and
cause the third action to be performed.

14. The system of claim 13, wherein the memory further comprises instructions that, when executed by the at least one processor, further cause the system to:
determine that the second action is only visible to the first user profile;
determine that the first user profile is associated with at least the first device and a second device;
determine that the second device is also associated with a second user profile;
determine that the first device is only associated with the first user profile; and send the first output data to the first device.

15. The system of claim 12, wherein the memory further comprises instructions that, when executed by the at least one processor, further cause the system to:
perform natural language processing to the first information to determine at least a first entity represented in the first information and at least one attribute associated with the first entity;
store the first entity in a knowledge graph associated with the first user profile; and
store the at least one attribute in the knowledge graph.

16. The system of claim 12, wherein the memory further comprises instructions that, when executed by the at least one processor, further cause the system to:
determine that the first information corresponds to a reoccurring event;
generate calendar data representing the reoccurring event; and
store the calendar data in association with the first user profile.

17. The system of claim 12, wherein the memory further comprises instructions that, when executed by the at least one processor, further cause the system to:
determine that a first portion of the first input data corresponds to the first natural language input;
determine that a second portion of the first input data corresponds to media content; and
process the second portion of the first input data to generate the first information.

18. The system of claim 12, wherein the memory further comprises instructions that, when executed by the at least one processor, further cause the system to:
determine that the first input data includes a representation of a first wakeword;
determine that the representation satisfies a condition; and
store the first information in association with the first user profile and the first wakeword.

* * * * *